US009916687B2

United States Patent
Hayakawa et al.

(10) Patent No.: US 9,916,687 B2
(45) Date of Patent: Mar. 13, 2018

(54) COMPUTER-READABLE RECORDING MEDIUM RECORDING INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Takeshi Hayakawa, Kyoto (JP); Naoki Koga, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 73 days.

(21) Appl. No.: 14/270,739

(22) Filed: May 6, 2014

(65) Prior Publication Data
US 2015/0109335 A1    Apr. 23, 2015

(30) Foreign Application Priority Data

Oct. 18, 2013  (JP) .................................. 2013-217447

(51) Int. Cl.
G06T 19/00 (2011.01)
G06K 9/00 (2006.01)
G06K 9/62 (2006.01)

(52) U.S. Cl.
CPC .......... *G06T 19/006* (2013.01); *G06K 9/6217* (2013.01)

(58) Field of Classification Search
CPC .......................... G06T 19/006; G06K 9/6217
(Continued)

(56) References Cited

U.S. PATENT DOCUMENTS 6,951,515 B2 * 10/2005 Ohshima ................. A63F 13/10
463/31
2006/0203008 A1 * 9/2006 Hiroshige ............. G06F 3/0338
345/619
(Continued)

FOREIGN PATENT DOCUMENTS

JP    2000-322602        11/2000
JP    2006-260602 A       9/2006
(Continued)

OTHER PUBLICATIONS

Ozuysal, Fast Keypoint Recognition Using Random Ferns, IEEE Transactions on Pattern Analysis and Machine Intelligence, vol. 32, No. 3, Mar. 2010, pp. 448-461.*
(Continued)

*Primary Examiner* — Devona Faulk
*Assistant Examiner* — Hai Tao Sun
(74) *Attorney, Agent, or Firm* — Nixon & Vanderhye, P.C.

(57) ABSTRACT

An example computer includes: an image acquiring unit that acquires an image of a real space captured by an imaging device; a feature detecting unit that detects a feature from the image; a determining unit that determines a virtual object, or, a virtual object and an aspect of the virtual object while changing the same in accordance with a recognition condition of the detected feature; an image generating unit that generates an image of a virtual space in which the determined virtual object or the virtual object in the determined aspect is placed on a basis of the feature; and a display controlling unit that displays an image on a display device such that the image of the virtual space is visually recognized by a user while being superimposed on the real space.

14 Claims, 17 Drawing Sheets

(58) Field of Classification Search
USPC .......................................................... 345/633
See application file for complete search history.

(56) References Cited

U.S. PATENT DOCUMENTS

| | | | | |
|---|---|---|---|---|
| 2008/0122869 | A1* | 5/2008 | Aratani | G06T 7/0042 345/633 |
| 2012/0032977 | A1 | 2/2012 | Kim et al. | |
| 2012/0120103 | A1* | 5/2012 | Border | G02B 27/017 345/633 |
| 2012/0194554 | A1* | 8/2012 | Kaino | G08B 13/19621 345/633 |
| 2012/0256956 | A1* | 10/2012 | Kasahara | G06F 3/04815 345/633 |
| 2013/0257907 | A1* | 10/2013 | Matsui | G09G 5/377 345/633 |
| 2013/0321261 | A1* | 12/2013 | Nakasu | G06F 3/0304 345/156 |
| 2014/0125699 | A1* | 5/2014 | Lotto | G06F 3/011 345/633 |
| 2014/0225919 | A1 | 8/2014 | Kaino et al. | |
| 2014/0375691 | A1 | 12/2014 | Kasahara | |
| 2016/0133057 | A1 | 5/2016 | Kaino et al. | |
| 2016/0133058 | A1 | 5/2016 | Kaino et al. | |
| 2017/0186242 | A1 | 6/2017 | Kaino et al. | |

FOREIGN PATENT DOCUMENTS

| | | |
|---|---|---|
| JP | 2013-092964 A | 5/2013 |
| JP | 2013-105253 A | 5/2013 |
| JP | 2013-530462 A | 7/2013 |

OTHER PUBLICATIONS

Kato et al., "An Augmented Reality System and its Calibration based on Marker Tracking", *TVRSJ*, vol. 4, No. 4, 11 pages with a partial translation.

Office Action dated Jun. 20, 2017 in corresponding Japanese Patent Application No. 2013-217447 with English trans.

Tada, "Development of a Bouldering Instruction System Using Augmented Reality Technology", IEICE, Technical Report, ET2013-7 (May 2013), vol. 113, No. 67, pp. 35-39, May 19, 2013.

* cited by examiner

FIG.12

| POSTURE CORRESPONDENCE INFORMATION | |
|---|---|
| MARKER 3A | |
| MARKER 3B | |
| MARKER 3A | OBJECT 4A-1 |
| POSTURE 1 | MOTION A |
| POSTURE 2 | MOTION B |
| POSTURE 3 | MOTION C |

COMPUTER-READABLE RECORDING MEDIUM RECORDING INFORMATION PROCESSING PROGRAM, INFORMATION PROCESSING APPARATUS, INFORMATION PROCESSING SYSTEM, AND INFORMATION PROCESSING METHOD

This application is based upon and claims the benefit of priority of the prior Japanese Patent Application No. JP2013-217447, filed on Oct. 18, 2013, the entire contents of which are incorporated herein by reference.

FIELD

The present disclosure relates to a computer-readable recording medium that records therein an information processing program for superimposing various pieces of information on a real space, an information processing apparatus, an information processing system, and an information processing method.

BACKGROUND AND SUMMARY

Augmenting a real world by presenting a real space on which various pieces of information are superimposed is referred to as augmented reality (AR). A technique using a marker for AR, for example, a two-dimensional bar code printed on a card is taken as one of the techniques for such AR. In this technique, the two-dimensional bar code is discriminated as the marker for AR from a captured image of a camera, and three-dimensional image data associated with the marker is displayed on a display device while being superimposed at the position of the two-dimensional bar code.

Unfortunately, in this augmented reality technique, on a screen of the display device on which the captured image is displayed, the three-dimensional image data corresponding to the marker is simply displayed while being superimposed at the position of the marker, and hence visual effects are monotonous.

The present disclosure provides a computer-readable recording medium that records therein an information processing program causing a computer to function as: an image acquiring unit that acquires an image of a real space captured by an imaging device; a feature detecting unit that detects a feature from the image; a determining unit that determines a virtual object, or, a virtual object and an aspect of the virtual object while changing the same in accordance with a recognition condition of the detected feature; an image generating unit that generates an image of a virtual space in which the determined virtual object or the virtual object in the determined aspect is placed on a basis of the feature; and a display controlling unit that displays an image on a display device such that the image of the virtual space is visually recognized by a user while being superimposed on the real space.

Here, the display device may be connected as a peripheral device to the information processing apparatus according to the present disclosure, and may be connected thereto via a communication network or the like. Moreover, the information processing apparatus according to the present disclosure may be constructed in a virtual environment such as so-called cloud computing.

Moreover, the feature placed in the real space refers to, for example, so-called a marker for AR or a code such as a two-dimensional bar code. Then, such a feature may be given to, for example, a component such as a card. Moreover, such a feature is not limited to a dedicated marker, a code, and the like. Even items used for other purposes can be used as the feature as long as a display reference of the virtual object can be acquired therefrom.

According to the present disclosure, at least one of the virtual object and the aspect of the virtual object displayed on the basis of the feature changes in accordance with the recognition condition of the feature, and hence an augmented reality technique rich in visual variety can be provided.

Note that the type of augmented reality technique to which the present disclosure is applied is not limited. The present disclosure can be applied to, for example, augmented reality techniques in which: a composite image obtained by superimposing a virtual space image on a captured image is displayed; and the virtual space image is thus visually recognized by the user while being superimposed on the real space. The present disclosure can also be applied to augmented reality techniques (for example, HUD: Head-Up Display) in which a virtual space image is projected on the field of view of the user, to be thereby visually recognized by the user while being superimposed on the real space.

Moreover, for the recognition condition of the feature, when it is determined that an elapsed time from last-time detection of the feature is equal to or more than a first threshold or when it is determined that the elapsed time is equal to or more than the first threshold and less than a second threshold, the determining unit may change the virtual object, or, the virtual object and the aspect of the virtual object placed in the virtual space on the basis of the feature.

As a result, for example, each time the user performs an action such as an action of hiding the feature by moving his/her hand in front of the feature and an action of once moving the feature out of the capturing range and then returning the feature thereinto, at least one of the virtual object and the aspect of the virtual object displayed on the basis of the feature changes. As a result, an augmented reality technique rich in visual variety can be provided.

Moreover, for the recognition condition of the feature, in accordance with the number of times of detection of the feature for which it is determined that an elapsed time from last-time detection of the feature is equal to or more than a first threshold or in accordance with the number of times of detection of the feature for which it is determined that the elapsed time is equal to or more than the first threshold and less than a second threshold, the determining unit may change the virtual object, or, the virtual object and the aspect of the virtual object placed in the virtual space on the basis of the feature. As a result, the user can develop an inquiring mind about an operation for a change in the displayed virtual object or the aspect of the displayed virtual object, and entertainment properties of the augmented reality technique can be improved.

Moreover, for the recognition condition of the feature, in accordance with duration of the detection of the feature from the image of the real space acquired by the image acquiring unit, the determining unit may change the virtual object or the virtual object and the aspect of the virtual object placed in the virtual space on the basis of the feature. As a result, even if the user does not perform an operation on the feature, the virtual object or the aspect of the virtual object displayed on the basis of the feature changes, and hence the user can easily enjoy a visual change in the augmented reality technique.

Moreover, for the recognition condition of the feature, in accordance with a posture of the feature, the determining unit may change the virtual object or the virtual object and the aspect of the virtual object placed on the basis of the feature. As a result, if the posture of the feature is changed, the displayed virtual object or the aspect of the displayed virtual object changes. Hence, the user can develop an inquiring mind about an operation for a change in the displayed virtual object or the aspect of the displayed virtual object, and entertainment properties of the augmented reality technique can be improved.

Moreover, in accordance with the recognition condition of the feature, the determining unit may change the virtual object, or, the virtual object and the aspect of the virtual object placed in the virtual space on the basis of the feature, in predetermined order from among a plurality of virtual objects associated with the feature or a plurality of aspects of a virtual object associated with the feature. Alternatively, the determining unit may change the virtual object, or, the virtual object and the aspect of the virtual object placed in the virtual space on the basis of the feature, cyclically in the predetermined order.

Moreover, the aspect of the virtual object may be defined by an external appearance of the virtual object. Moreover, the aspect of the virtual object may be defined by a posture of the virtual object. Moreover, the aspect of the virtual object may be defined by a motion made by the virtual object. As a result, the aspect of the virtual object can be rich in variety.

Moreover, the present disclosure can be interpreted as an information processing apparatus, an information processing system including one or more information processing apparatuses, a method to be executed by a computer, or a program to be executed by a computer. Moreover, the present disclosure can also be interpreted as a recording medium that records therein such a program, the recording medium being readable by computers, other apparatuses or machines, and the like. Here, the recording medium readable by the computers and the like refers to a recording medium that can accumulate therein information such as data and a program through an electrical, magnetic, optical, mechanical, or chemical action, and allows the computers and the like to read such information out thereof.

BRIEF DESCRIPTION OF THE DRAWINGS

FIG. 12 shows example non-limiting posture correspondence information;

DETAILED DESCRIPTION OF NON-LIMITING EXAMPLE EMBODIMENTS

Hereinafter, embodiments of the present disclosure are described with reference to the drawings. Note that the embodiments described below are given as mere examples for carrying out the present disclosure, and the present disclosure is not limited to specific configurations described below. At the time of carrying out the present disclosure, a specific configuration may be adopted as appropriate for each embodiment. For example, the present disclosure can be applied to: an information processing program executed by a computer of a portable information processing apparatus; an information processing apparatus; an information processing system including one or more information processing apparatuses; and an information processing method.

The present disclosure has an object to provide a technique for augmented reality rich in visual variety.

System Configuration

Figure 1:
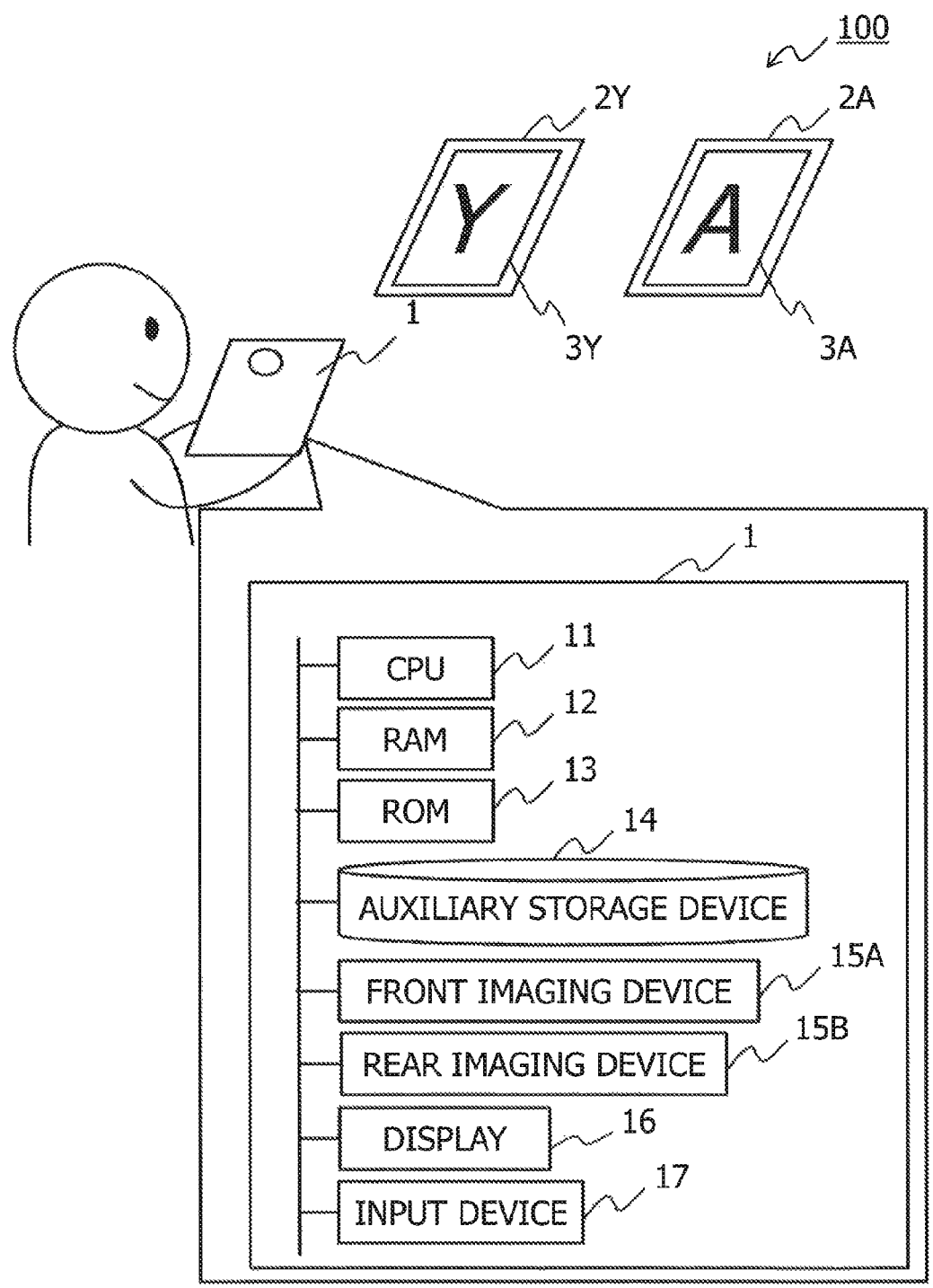
FIG. 1 shows an example non-limiting configuration of an information processing system according to a first embodiment.

FIG. 1 shows an example non-limiting configuration of an information processing system 100 according to a first embodiment. The information processing system 100 includes an information processing apparatus 1 and cards 2A and 2Y (which are simply referred to as "cards 2" in the case where the types of cards are not distinguished).

The information processing apparatus 1 is, for example, a portable computer such as a portable game machine, a smartphone, a cellular phone terminal, and a tablet terminal. The information processing apparatus 1 is an information processing apparatus in which a CPU (Central Processing Unit) 11, a RAM (Random Access Memory) 12, a ROM (Read Only Memory) 13, an auxiliary storage device 14, a front imaging device 15A, a rear imaging device 15B, a display (display device) 16, and an input device 17 such as various buttons and a touch panel are electrically connected to one another. Note that, with regard to a specific hardware configuration of the information processing apparatus 1, components may be omitted, replaced, and added as appropriate for each embodiment. For example, in the case where the information processing apparatus 1 is a stationary game machine, the imaging devices, the display 16, the input device 17, and the like are independent devices, and are connected as peripheral devices to the information processing apparatus 1.

The CPU 11 is a central processing unit, and processes commands and data developed in the RAM 12, the ROM 13, and the like, to thereby control components included in the information processing apparatus 1, such as the RAM 12 and the auxiliary storage device 14. Moreover, the RAM 12 is a main storage device, and is controlled by the CPU 11. Various commands and various pieces of data are written into and read out of the RAM 12. That is, the CPU 11, the RAM 12, and the ROM 13 constitute a control unit of the information processing apparatus 1.

The auxiliary storage device 14 is a non-volatile storage device. Information that is desired to be held even if the information processing apparatus 1 is powered down, and the like are mainly written into and read out of the auxiliary storage device 14. Examples of the information desired to be held include: an OS (Operating System) of the information processing apparatus 1 and various programs for executing processing to be described later loaded onto the RAM 12; and various pieces of data used by the information processing apparatus 1. Examples of the auxiliary storage device 14 include an EEPROM (Electrically Erasable Programmable ROM) and a HDD (Hard Disk Drive). Examples of the auxiliary storage device 14 may further include a removable medium that is detachably attached to the information processing apparatus 1. Examples of the removable medium include a memory card made of an EEPROM and the like, a CD (Compact Disc), a DVD (Digital Versatile Disc), and a BD (Blu-ray Disc). An auxiliary storage device 14 made of the removable medium and a non-removable auxiliary storage device 14 can be used in combination.

The front imaging device 15A and the rear imaging device 15B are also referred to as front camera 15A and rear camera 15B, respectively. The front side of the information processing apparatus 1 refers to, for example, the same side as the display screen of the display 16. The rear side of the information processing apparatus 1 refers to, for example, the opposite side to the display screen of the display 16. The front camera 15A is set on, for example, the front side of the information processing apparatus 1 such that the capturing direction thereof is the same as the direction in which the display screen of the display 16 faces. The rear camera 15B is set on, for example, the rear side of the information processing apparatus 1 such that the capturing direction thereof is opposite to that of the front camera 15A. The number of the rear cameras 15B may be, for example, two for stereoscopic view. Note that, in the case where the front imaging device 15A and the rear imaging device 15B are not particularly distinguished, the front imaging device 15A and the rear imaging device 15B are simply referred to as imaging devices 15.

Markers 3A and 3Y (which are simply referred to as "markers 3" in the case where the types of markers are not distinguished) different from each other are respectively put onto the cards 2A and 2Y through a method such as printing. Each marker 3 is associated with a virtual object displayed by the information processing apparatus 1, and serves as an index indicating a reference of the position when the virtual object associated with the marker 3 is displayed. The number of the cards 2 illustrated in FIG. 1 is two, but the number of the used cards 2 may be one and may be equal to or more than two.

The marker 3A is associated with, for example, a virtual object representing a predetermined character, by the information processing apparatus 1. Moreover, the marker 3A includes, for example, a feature that enables a user to recognize a relation with the form of the associated virtual object. The marker 3A is, for example, a figure representing at least part of the form of the associated virtual object. Specifically, the marker 3A is, for example, the face of a character that is the source of the associated virtual object. Note that, in the drawings, the marker 3A is illustrated in alphabet for convenience sake. Moreover, the card 2A on which the marker 3A is printed may be, for example, a paper card or a prepaid card.

The marker 3Y is associated with, for example, a predetermined virtual object by the information processing apparatus 1. Moreover, for example, unlike the marker 3A, the marker 3Y does not include a feature that enables the user to visually recognize a relation with the form of the associated virtual object. The marker 3Y is, for example, a paper card or a backing sheet of a prepaid card on which the marker 3A is printed. Hereinafter, the marker 3Y may also be referred to as reference marker 3Y.

In the first embodiment, on the display 16 of the information processing apparatus 1, a virtual object is placed at a predetermined position corresponding to the associated marker 3 within a captured image, and is compositely displayed on the captured image. Moreover, the virtual object has up-down, front-back, and left-right directions. Hence, it is preferable that the marker 3 enable identification of the display posture of the virtual object. That is, it is preferable that the marker 3 be symbols, characters, figures, pictures, combinations thereof, and the like that enable identification of the position and posture with respect to the imaging device 15 when being captured by the imaging device 15. Note that, in the first embodiment, the posture is identified in a coordinate system defined by three axes orthogonal to one another.

Figure 2:
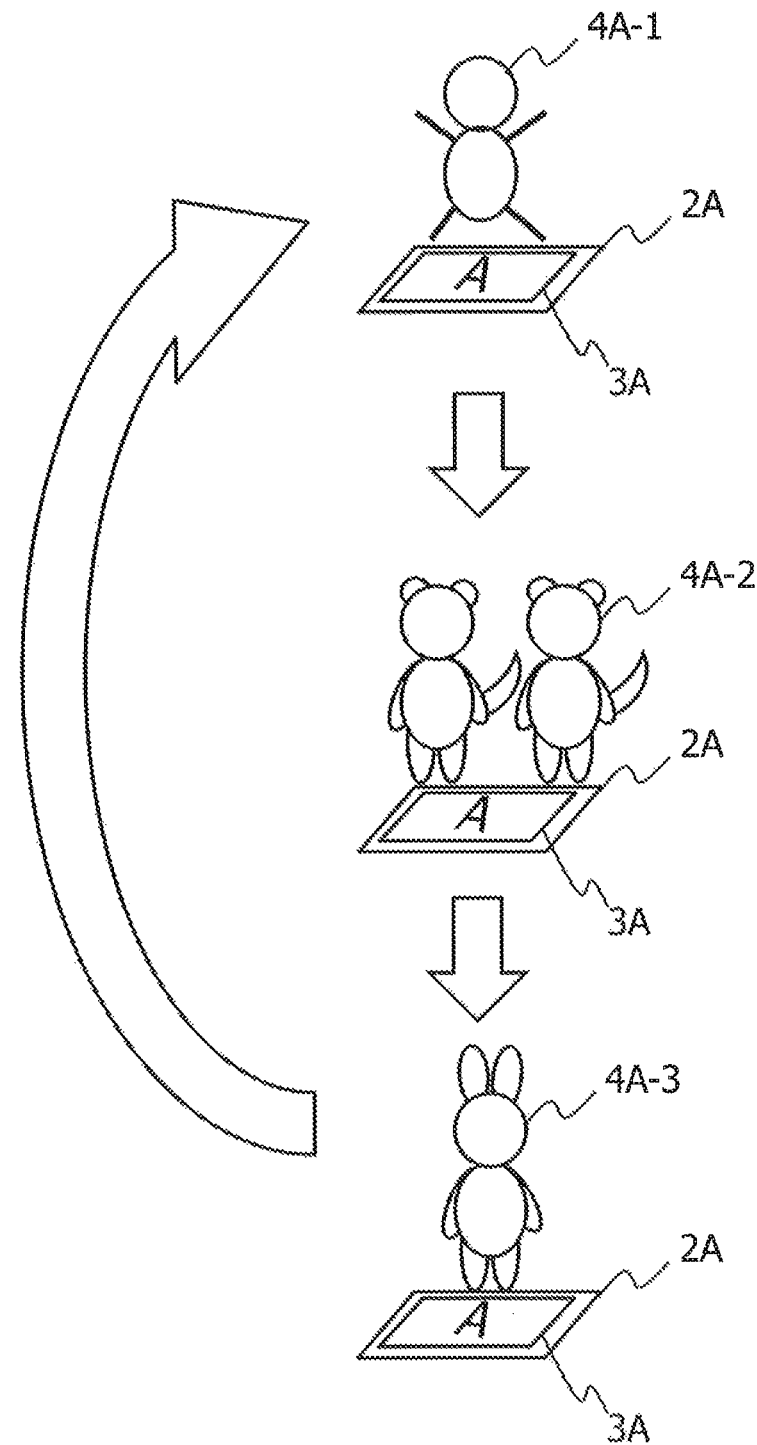
FIG. 2 shows an example non-limiting first AR process of an information processing apparatus according to the first embodiment.

FIG. 2 shows an example non-limiting first AR process of the information processing apparatus 1 according to the first embodiment. In the first AR process, each time detection of a marker by the rear camera 15B is suspended for a predetermined period of time and is then restarted, a virtual object that is displayed on the display 16 correspondingly to the marker changes.

For example, at the time of the first detection of the marker 3A by the rear camera 15B, a virtual object 4A-1 is displayed at a predetermined position corresponding to the marker 3A. In the case where the detection of the marker 3A by the rear camera 15B is suspended and restarted by a user's action (such as an action of once moving the card 2A out of the capturing range of the rear camera 15B and then returning the card 2A thereinto and an action of hiding the card 2A with his/her hand), a virtual object 4A-2 is displayed at the predetermined position based on the marker 3A. In the case where a similar action is further performed, the virtual object displayed at the predetermined position corresponding to the marker 3A changes to a virtual object 4A-3.

That is, in the first AR process, in the case where the interval between the last-time detection of the marker 3 and the this-time detection of the marker 3 is equal to or more than a predetermined period of time, the information processing apparatus 1 displays a virtual object different from a virtual object displayed last time, at a predetermined position based on the marker 3. The predetermined period of time is, for example, 1 second.

A function of the information processing apparatus 1 for implementing the first AR process is described. The information processing apparatus 1 according to the first embodiment is an information processing apparatus having a so-called AR function. The information processing apparatus 1 has a function of: superimposing a virtual object in a virtual space drawn (rendered) using a virtual camera, on a captured image in a real space captured using the imaging device 15; and displaying the resultant composite image on the display 16. In the present embodiment, the virtual object is three-dimensional image data. Note that the virtual object may be two-dimensional image data.

Figure 3:
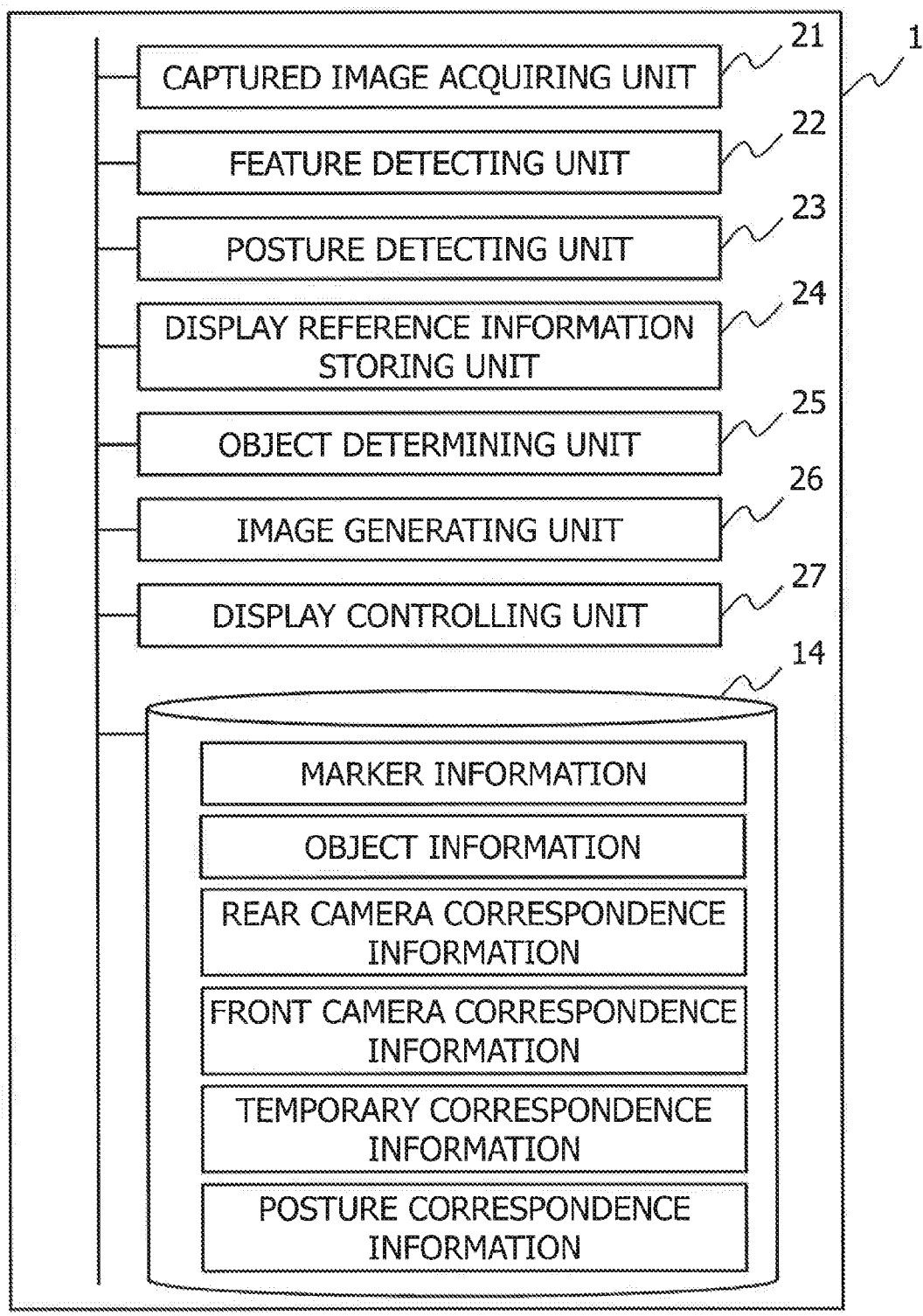
FIG. 3 shows an example non-limiting functional configuration of the information processing apparatus according to the first embodiment.

FIG. 3 shows an example non-limiting functional configuration of the information processing apparatus 1 according to the first embodiment. When the CPU 11 interprets and executes various programs developed in the RAM 12, the information processing apparatus 1 functions as an information processing apparatus including a captured image acquiring unit 21, a feature detecting unit 22, a posture detecting unit 23, a display reference information storing unit 24, an object determining unit 25, an image generating unit 26, and a display controlling unit 27. In the first embodiment, description is given of an example in which these functions are all executed by the general-purpose CPU 11, but the entirety or a part of these functions may be implemented by one or more dedicated processors.

The captured image acquiring unit 21 acquires a captured image captured by the imaging device 15. The captured image is acquired at, for example, the capturing rate of the imaging device 15. For example, in the case where the capturing rate of the imaging device 15 is 60 fps (frames per second), the captured image acquiring unit 21 acquires a captured image every sixtieth of a second. Note that both the front imaging device 15A and the rear imaging device 15B are not activated together. That is, in the case where any one of the two devices is activated, the other thereof is disabled. Moreover, information on the enabled or disabled states of the front imaging device 15A and the rear imaging device 15B is managed by, for example, a flag. This flag may be prepared for each imaging device 15, for example. For example, in the case where the flag is 1, this indicates that the corresponding imaging device 15 is enabled. This flag makes it possible to determine which imaging device 15 has captured the captured image.

The feature detecting unit 22 performs image processing such as pattern matching on the image captured by the imaging device 15, and thus can detect the marker 3 included in this image. The marker 3 is detected using, for example, an image recognition engine. Moreover, the feature detecting unit 22 can also detect positional information of the marker 3, in addition to the detection of the marker 3 included in the captured image. The positional information of the marker 3 is, for example, coordinates of the marker 3 within the screen of the display 16.

The posture detecting unit 23 detects the position and posture of the marker 3 in the space captured in the captured image, on the basis of the detected marker 3, and generates display reference information. The display reference information storing unit 24 stores the display reference information for determining the position and posture of a virtual object placed in the virtual space. The display reference information storing unit 24 is created in, for example, a storage area of the RAM 12. In the first embodiment, the display reference information is a reference used to indicate the position and posture of the virtual object within the virtual space. Alternatively, the display reference information may be a reference used to simply indicate any one of the position and posture of the virtual object within the virtual space. As the display reference information, the posture detecting unit 23 in the first embodiment acquires, for each marker 3, a marker coordinate system that has the central point of the marker 3 as its origin and is defined by three axes orthogonal to one another. Note that something other than the marker coordinate system, such as the captured image itself, may be used as the display reference information. Moreover, one marker coordinate system can be shared and used among the plurality of markers 3. The coordinate system of the virtual space is defined with reference to the marker 3 placed in the real space, whereby the real space and the virtual space can be associated with each other. Note that a method other than the method using the marker coordinate system may be adopted for the association between the real space and the virtual space.

Each time a captured image is acquired, the posture detecting unit 23 detects the position and posture of the marker 3 in the imaging device, and updates the display reference information stored in the display reference information storing unit 24. Accordingly, in the first embodiment, the display reference information stored in the display reference information storing unit 24 is updated in accordance with a change in the latest position and posture of the marker 3 with respect to the imaging device 15 that change along with movement of the imaging device 15 and movement of the marker 3.

In the first embodiment, a virtual object placed in the virtual space is placed in the marker coordinate system of the marker 3 with which the virtual object is associated. The posture detecting unit 23 calculates the position and posture of the marker 3 with respect to the imaging device 15, from how the marker 3 included in the captured image looks, and thus can acquire the marker coordinate system. The position and posture of the virtual camera in the marker coordinate system is coincident with the position and posture of the imaging device 15 in the real space. Hence, if the virtual space is defined on the basis of the marker 3 and if the position and capturing direction of the imaging device 15 are changed in this virtual space, an image of the virtual space displayed on the display 16 changes accordingly.

The object determining unit 25 determines a virtual object to be placed at a predetermined position based on the detected marker 3. For example, the object determining unit 25 refers to rear camera correspondence information in accordance with a recognition condition of the marker, and thus determines the virtual object to be placed at the predetermined position based on the detected marker 3. Examples of the recognition condition of the marker include: whether or not the elapsed time from the last-time detection to the this-time detection falls within a predetermined range; and the number of times of detection in which the elapsed time from the last-time detection to the this-time detection falls within a predetermined range. Details thereof are described later.

The image generating unit 26 places a virtual object in the virtual space on the basis of the position and the posture according to the display reference information stored in the display reference information storing unit 24, and generates an image of the virtual space observed from the virtual camera, to thereby draw (render) a virtual space image. Then, the information processing apparatus 1 according to the first embodiment, which has the AR function as described above, generates a composite image in which the virtual space image that includes the virtual object and is generated by the image generating unit 26 is superimposed on the captured image acquired by the captured image acquiring unit 21.

The display controlling unit 27 displays the generated composite image on the display 16 as a display device. In this way, the user can feel as if the virtual object actually existed in the real space.

Next, information held by the information processing apparatus 1 is described. The information processing apparatus 1 holds, in the auxiliary storage device 14, marker information, object information, rear camera correspondence information, front camera correspondence information, temporary correspondence information, and posture correspondence information. Note that the front camera correspondence information, the temporary correspondence information, and the posture correspondence information are described in a second embodiment and the subsequent embodiments.

The marker information is information regarding the marker 3. The marker information includes, for example, a marker ID for identifying the marker 3, a marker image, a marker size, the placement position of a virtual object with respect to the marker 3, and the display size of the object. The marker image is an image indicating the external appearance of the marker 3. Moreover, the marker size is information indicating the dimensions of the marker 3, such as the height and width of the marker 3. The placement position of a virtual object with respect to the marker 3 is, for example, the position at which the virtual object is placed with respect to the marker 3, and is, for example, the distance between the marker 3 and the virtual object. The marker information exists for each marker 3 used in the information processing system 100.

The object information is information regarding a virtual object. The object information contains, for example, an object ID for identifying a virtual object and data of the object. The object information exists for each object used in the information processing system 100.

Figure 4:
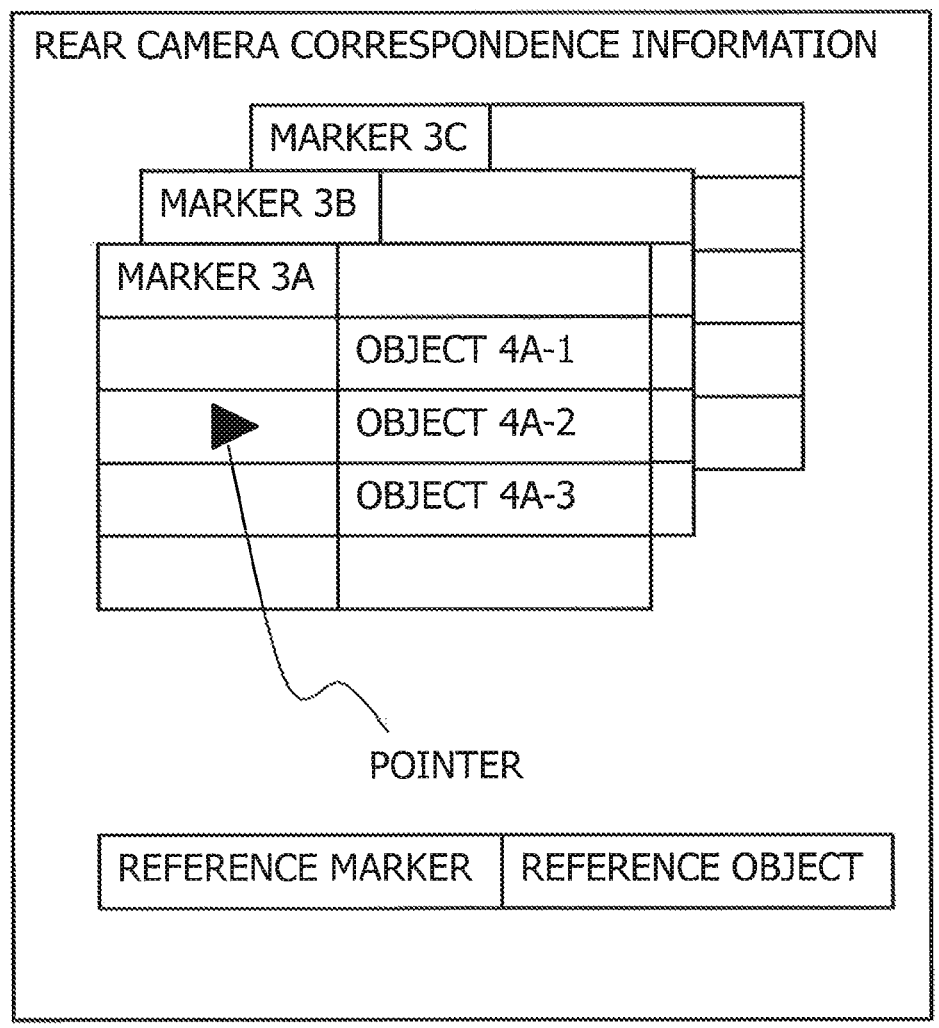
FIG. 4 shows example non-limiting rear camera correspondence information according to the first embodiment.

FIG. 4 shows example non-limiting rear camera correspondence information according to the first embodiment. The rear camera correspondence information is information on the association between the marker 3 and a virtual object, and is information that is referred to at the time of determining a virtual object to be placed at a predetermined position based on the detected marker 3.

The rear camera correspondence information contains, for example, a marker ID, a virtual object ID, and a pointer. In the first embodiment, in the rear camera correspondence information, a plurality of virtual objects are associated with one marker, and a virtual object indicated by the pointer is placed at a predetermined position based on the corresponding marker 3. For example, in the case where the elapsed time from the last-time detection to the this-time detection of the corresponding marker falls within a predetermined time range, the pointer is moved to another virtual object by the object determining unit 25. Details thereof are described later. The movement destination of the pointer may be determined at random, and may be determined according to a list of the virtual objects, for example. In the case where the pointer is moved in ranking order of the list of the virtual objects, the pointer may be cyclically moved. That is, in the case where the pointer reaches the last virtual object in the list, the pointer may be then moved to the first virtual object in the list.

Note that, in the first embodiment, the rear camera correspondence information holds information on every marker 3 used in the information processing system 100. The rear camera correspondence information also holds information on the association between the reference marker 3Y and a virtual object. Note that a plurality of virtual objects 4 may not be associated with every marker 3, and the number of virtual objects associated with one marker 3 may be one. For example, the number of virtual objects associated with the reference marker 3Y is one (virtual object 4Y).

Flow of Processing

Next, a flow of processing executed in the first embodiment is described. Note that specific processing contents and processing order in a flow chart according to the first embodiment are given as mere examples for carrying out the present disclosure. Specific processing contents and processing order may be selected as appropriate for each embodiment of the present disclosure.

Figure 5:
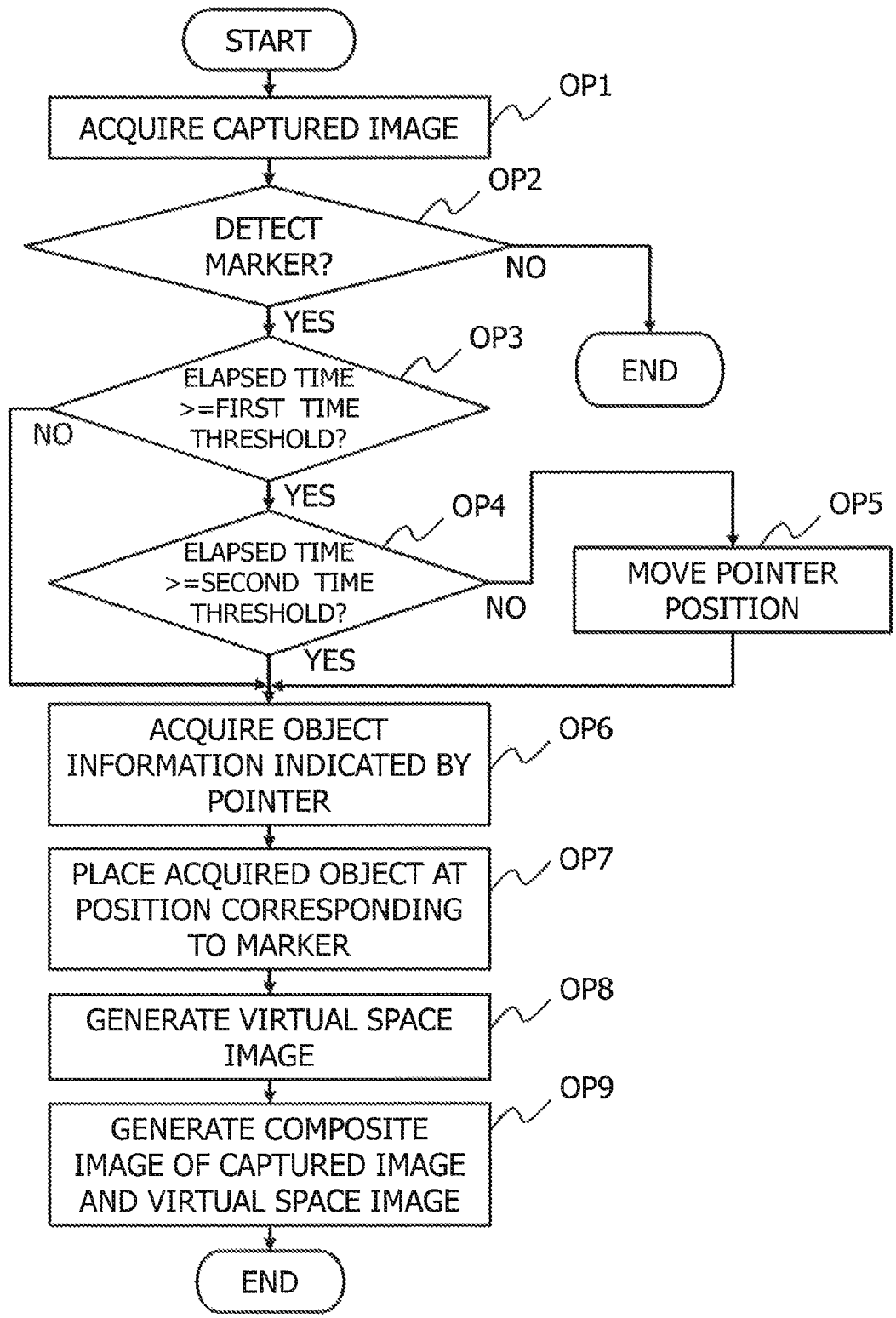
FIG. 5 shows an example non-limiting flow chart of the first AR process.

FIG. 5 shows an example non-limiting flow chart of the first AR process. The flow chart in FIG. 5 is started upon reception of a user operation for activating the AR function of the information processing apparatus 1.

In OP1, the captured image acquiring unit 21 acquires a captured image captured by the imaging device 15. Consequently, the flow chart in FIG. 5 is executed for each captured image acquired at the capturing rate (for example, 60 fps) of the imaging device 15. In OP2, the feature detecting unit 22 detects, from the captured image, the marker 3 corresponding to the marker image contained in the marker information, as a feature in the captured space. If the marker is detected (OP2: YES), the processing proceeds to OP3. The marker 3 can be detected using a general image recognition engine. If the marker is not detected (OP2: NO), the processing in FIG. 5 is ended.

In OP3, the object determining unit 25 determines whether or not the measured elapsed time from the last-time detection to the this-time detection of the processing target marker 3 is equal to or more than a first time threshold. The first time threshold is, for example, 1 second. If the measured elapsed time from the last-time detection to the this-time detection of the processing target marker 3 is equal to or more than the first time threshold (OP3: YES), the processing proceeds to OP4. If the measured elapsed time from the last-time detection to the this-time detection of the processing target marker 3 is less than the first time threshold (OP3: NO), the processing proceeds to OP6.

Note that the object determining unit 25 measures the elapsed time from the detection for each marker 3 detected by the feature detecting unit 22, and records the measurement result as measured elapsed time into the memory. The measured elapsed time is reset each time the corresponding marker 3 is detected from the captured image. For example, in the case where the captured image is acquired at a rate of 60 fps and where the marker 3 is continuously detected, the measured elapsed time for the marker 3 is reset each time the captured image is acquired. Note that, if a predetermined period of time (for example, 5 minutes) has elapsed without detection of the corresponding marker 3 after the last detection thereof, the object determining unit 25 deletes the measured elapsed time for the corresponding marker 3. In the process of OP3, if the measured elapsed time for the processing target marker 3 is not recorded, the object determining unit 25 determines that the measured elapsed time for the processing target marker 3 is less than the first time threshold (OP3: NO).

In OP4, the object determining unit 25 determines whether or not the measured elapsed time for the processing target marker 3 is equal to or more than a second time threshold. The second time threshold is longer than the first time threshold, and is, for example, 3 to 10 seconds. If the measured elapsed time for the processing target marker 3 is equal to or more than the second time threshold (OP4: YES), the processing proceeds to OP6. If the measured elapsed time for the processing target marker 3 is less than the second time threshold (OP4: NO), the processing proceeds to OP5.

In OP5, the object determining unit 25 moves the pointer position in the rear camera correspondence information of the processing target marker 3. The movement destination of the pointer may be determined at random, and may be a virtual object listed next to the current pointer position. The processing then proceeds to OP6.

In OP6, the object determining unit 25 acquires a virtual object indicated by the pointer in the rear camera correspondence information of the processing target marker 3. The processing then proceeds to OP7. In the case where the number of the markers 3 detected from the captured image is more than one, the processes of OP3 to OP6 are executed for each marker 3.

In OP7, the image generating unit 26 places the acquired virtual object at a predetermined position based on the associated marker 3. The position and posture of the marker 3 have been detected as the display reference information by the posture detecting unit 23 together with the detection of the marker 3, and the image generating unit 26 places the virtual object at the predetermined position based on the marker 3 in accordance with the display reference information. The processing then proceeds to OP8.

In OP8, the image generating unit 26 generates an image of the virtual space. The image generating unit 26 draws the image of the virtual space including one or more virtual objects placed in the marker coordinate system, from the point of view of the virtual camera that is placed at the same position as that of the imaging device 15 in the marker coordinate system. Object data for drawing each virtual object is acquired from the object information. Note that the virtual object may change for each frame or few frames, for animation. In the animation, for example, the facial expression of a character as the virtual object can be changed, and the character can be moved. After that, the processing proceeds to OP9.

In OP9, the display controlling unit 27 generates a composite image in which the image of the virtual space is superimposed on the captured image, and outputs and displays the composite image onto the display 16.

In the flow chart in FIG. 5, the first time threshold and the second time threshold are used to detect a user's action such as: an action of once hiding the marker 3 with his/her hand and then taking his/her hand off to cause the marker 3 to be detected again; and an action of moving the card 2 out of the capturing range and then returning the card 2 into the capturing range to cause the marker to be detected again. In the case where the measured elapsed time from the last-time detection to the this-time detection is equal to or more than the first time threshold and less than the second time threshold, it is determined that such a user's action as described above has been performed, the processing proceeds to OP5, and the pointer in the rear camera correspondence information of the corresponding marker 3 is moved. Accordingly, in the case where a user's action such as an action of hiding the marker 3 with his/her hand and where the marker 3 is detected again, a virtual object different from a virtual object displayed at the last-time detection is displayed. As a result, augmented reality rich in variety can be provided to the user, and services that do not tire the user can be provided.

For example, without such a user's action as described above, in the case where the marker 3 is detected from images that are continuously captured at the capturing rate (for example, 60 fps) of the imaging device 15, the measured elapsed time from the last-time detection to the this-time detection is 1/60 seconds. This is shorter than the first time threshold (for example, 1 second) (OP3: NO). Hence, the processing proceeds to OP6, the pointer in the rear camera correspondence information of the corresponding marker 3 is not moved, and the same virtual object as that displayed at the last-time detection is displayed at the predetermined position corresponding to the corresponding marker 3. Note that, in the case where the information processing apparatus 1 detects the marker 3 for the first time, because the measured elapsed time is not recorded, the object determining unit 25 determines that the first time threshold has not elapsed from the last-time detection (OP3: NO), and the processing proceeds to OP6.

For example, in the case where the marker 3 is not detected for one minute or longer and where the marker 3 is then detected again (for example, in the case where the information processing apparatus 1 comes into a power-saving mode or where the user keeps the marker 3 out of the capturing range), it is determined that the measured elapsed time from the last-time detection is equal to or more than the second time threshold (OP4: YES), the processing proceeds to OP6, and the same virtual object as that displayed at the last-time detection is displayed.

Note that the first AR process is not limited to the flow chart in FIG. 5. For example, the process of OP4 can be omitted. In the case where the process of OP4 is omitted, even if the elapsed time from the last-time detection to the this-time detection of the marker 3 is equal to or more than the second time threshold, the processing proceeds to the process of OP5, the pointer in the rear camera correspondence information is moved, and a virtual object different from that displayed at the last-time detection is displayed.

Moreover, if the measured elapsed time from the detection of the marker 3 becomes, for example, equal to or more than a predetermined period of time (for example, 5 minutes), the object determining unit 25 deletes the record of the measured elapsed time for the marker 3. In this case, in the processing of the flow chart in FIG. 5, when the corresponding marker 3 is detected next time, a virtual object indicated by the pointer in the rear camera correspondence information, that is, the same virtual object as the virtual object displayed at the last-time detection of the corresponding marker 3 is displayed. Alternatively, along with the record deletion of the measured elapsed time for the marker 3, the object determining unit 25 may return the pointer in the rear camera correspondence information of the marker 3 to its default position. The default position of the pointer in the rear camera correspondence information is, for example, the head of the list of the plurality of virtual objects associated with the corresponding marker 3.

Operations and Effects of First Embodiment

In the first AR process of the first embodiment, the virtual object placed at a position corresponding to the marker 3 changes in accordance with a recognition condition of the marker 3. As a result, the AR process can be rich in visual variety and excellent in entertainment.

Modification of First AR Process

In the first AR process, each time the this-time detection of the marker 3 occurs within the range in which the elapsed time from the last-time detection of the marker 3 is equal to or more than the first time threshold and less than the second time threshold, the virtual object placed at the predetermined position based on the marker 3 changes. Alternatively, the virtual object placed at the predetermined position based on the marker 3 may change in accordance with the period of time or the number of times of continuous detection of the marker 3.

For example, the object determining unit 25 counts the period of time or the number of times of continuous detection of the marker 3 from the first detection thereof, and moves the pointer in the rear camera correspondence information of the corresponding marker 3 when the counting result reaches a predetermined period of time or a predetermined number of times. As a result, as long as the marker 3 is detected, the virtual object displayed at the predetermined position based on the marker 3 changes with time. In the case where the marker 3 is not detected or where the period of time or the number of times of continuous detection of the marker 3 from the first detection thereof reaches the predetermined period of time or the predetermined number of times, the counter for the period of time or the number of times of continuous detection of the marker 3 from the first detection thereof is reset.

Moreover, the virtual object placed at the predetermined position based on the marker 3 may change in accordance with the number of times of detection that occurs within the range in which the measured elapsed time from the last-time detection of the marker 3 is equal to or more than the first time threshold and less than the second time threshold. That is, the virtual object placed at the predetermined position based on the marker 3 may change in accordance with the number of times of a user's action that causes the information processing apparatus 1 to recognize the marker 3 again, for example, a user's action of moving the marker 3 out of and into the capturing range. In this case, the object determining unit 25 counts, for each detected marker 3, the number of times of detection that occurs within the range in which the measured elapsed time from the last-time detection is equal to or more than the first time threshold and less than the second time threshold. The counter for the number of times of such detection is incremented by 1, for example, in the case where detection occurs within the range in which the measured elapsed time from the last-time detection of the marker 3 is equal to or more than the first time threshold and less than the second time threshold. The counter therefor is reset, for example, in the case where detection occurs within the range in which the measured elapsed time from the last-time detection of the corresponding marker 3 is equal to or more than the second time threshold. For example, each time the number of times of detection that occurs within the range in which the measured elapsed time from the last-time detection is equal to or more than the first time threshold and less than the second time threshold reaches two, that is, each time the user's action that causes the information processing apparatus 1 to recognize the marker 3 again is performed twice, the object determining unit 25 moves the pointer in the rear camera correspondence information of the corresponding marker 3.

Moreover, in the first AR process, each time detection occurs within the range in which the measured elapsed time from the last-time detection of the marker 3 is equal to or more than the first time threshold and less than the second time threshold, the virtual object placed at the position based on the marker 3 changes, but the aspect such as a state and a motion of the virtual object may change instead. For example, in the case where the virtual object is a predetermined character, each time detection occurs within the range in which the measured elapsed time from the last-time detection of the marker 3 is equal to or more than the first time threshold and less than the second time threshold, the external appearance (such as a facial expression and clothes) of the character may change, the posture and pose of the character may change, and the motion (such as sleeping and running) of the character may change.

These can be implemented by, for example, further associating an aspect with the association between the marker 3 and a virtual object in the rear camera correspondence information and setting, by the object determining unit 25, the aspect to the virtual object upon determination of the virtual object. In the rear camera correspondence information, for example, identification information of a file of a command to be executed by the virtual object is associated as an aspect with the marker 3. The virtual object is controlled by, for example, a dedicated program, and this program executes a command corresponding to an aspect of the rear camera correspondence information, to thereby cause the virtual object to execute the aspect.

Moreover, in both the cases where an image is captured by the rear camera 15B and where an image is captured by the front camera 15A, the first AR process may be executed.

Second Embodiment

In the second embodiment, the information processing apparatus performs a second AR process. In the second AR process, a displayed virtual object changes in accordance with imaging means in a real space. In the second embodiment, description overlapping with that in the first embodiment is omitted.

Figure 6A:
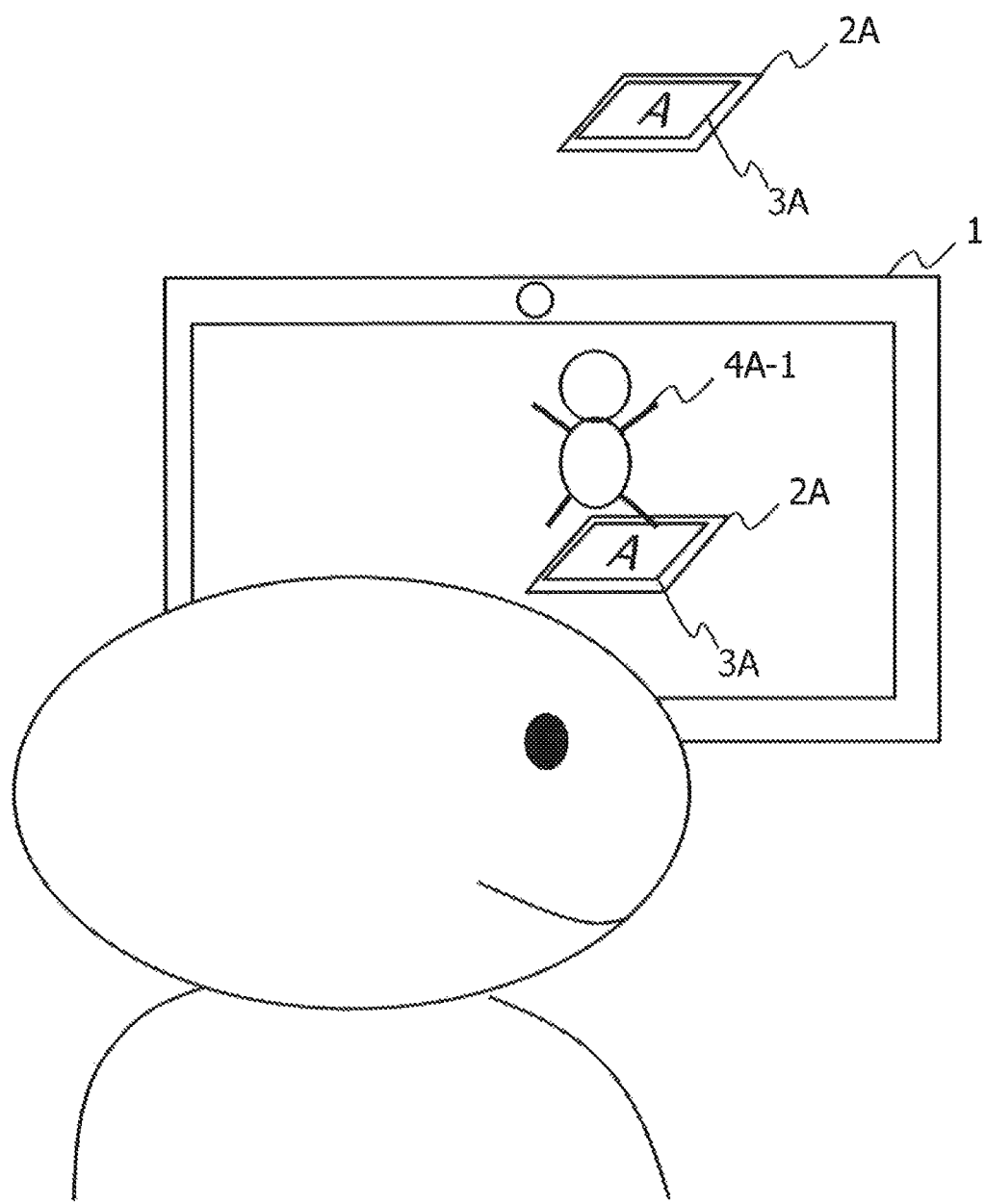
FIG. 6A shows an example non-limiting second AR process of an information processing apparatus according to a second embodiment.
Figure 6B:
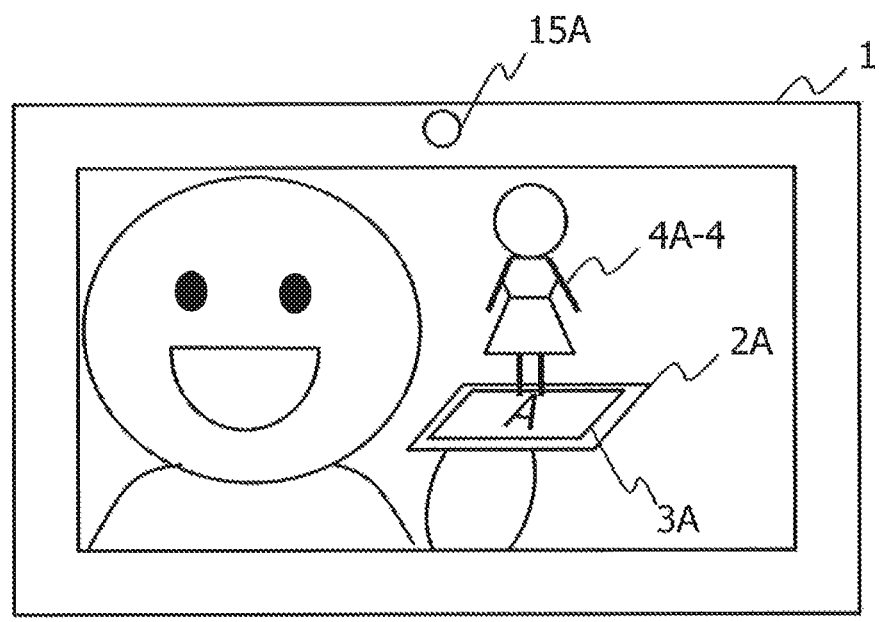
FIG. 6B shows an example non-limiting second AR process of the information processing apparatus according to the second embodiment.
Figure 6B:
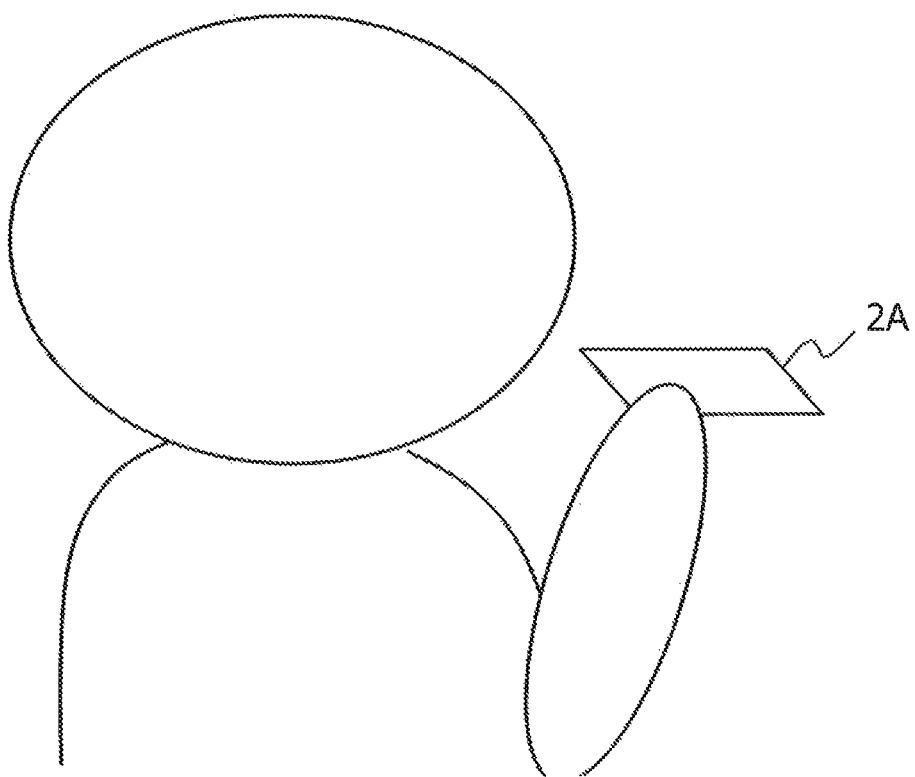

FIG. 6A and FIG. 6B show an example non-limiting second AR process of the information processing apparatus 1 according to the second embodiment. In the second AR process, the virtual object placed at the position based on the marker 3A changes in accordance with which of the front camera 15A and the rear camera 15B captures an image.

FIG. 6A illustrates a screen display example in the case where the marker 3A is captured by the rear camera 15B. In the case where the marker 3A is captured by the rear camera 15B, the virtual object 4A-1 is displayed at the predetermined position based on the marker 3A, on the screen of the display 16.

FIG. 6B illustrates a screen display example in the case where the marker 3A is captured by the front camera 15A. In the case where the marker 3A is captured by the front camera 15A, a virtual object 4A-4 different from the virtual object 4A-1, which is displayed in the case where the marker 3A is captured by the rear camera 15B, is displayed at the same predetermined position based on the same marker 3A as that in the example of FIG. 6A.

Both the hardware configuration and the functional configuration of the information processing apparatus 1 that executes the second AR process are similar to those in the first embodiment (see FIG. 1 and FIG. 3). In the second AR process, the object determining unit 25 uses the rear camera correspondence information and the front camera correspondence information to determine a virtual object to be placed at the predetermined position based on the detected marker 3.

Figure 6C:
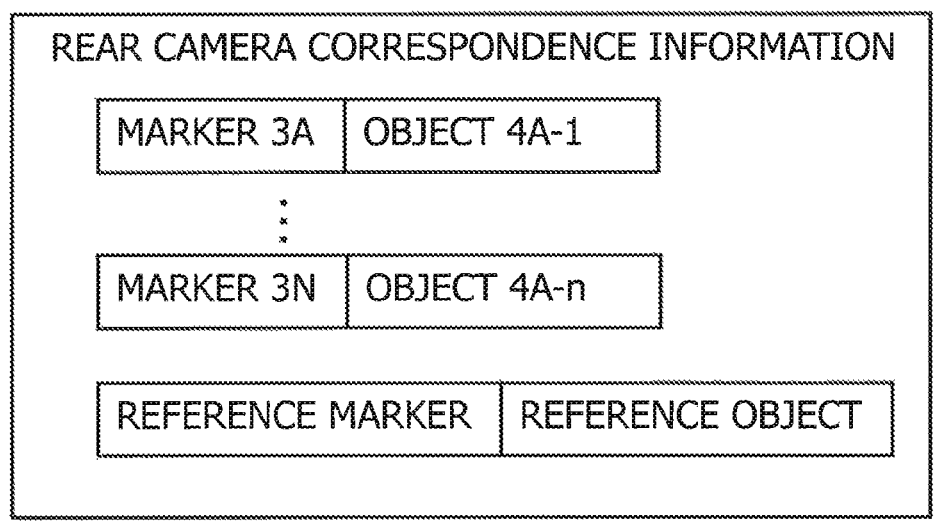
FIG. 6C shows example non-limiting rear camera correspondence information and example non-limiting front camera correspondence information according to the second embodiment.
Figure 6C:
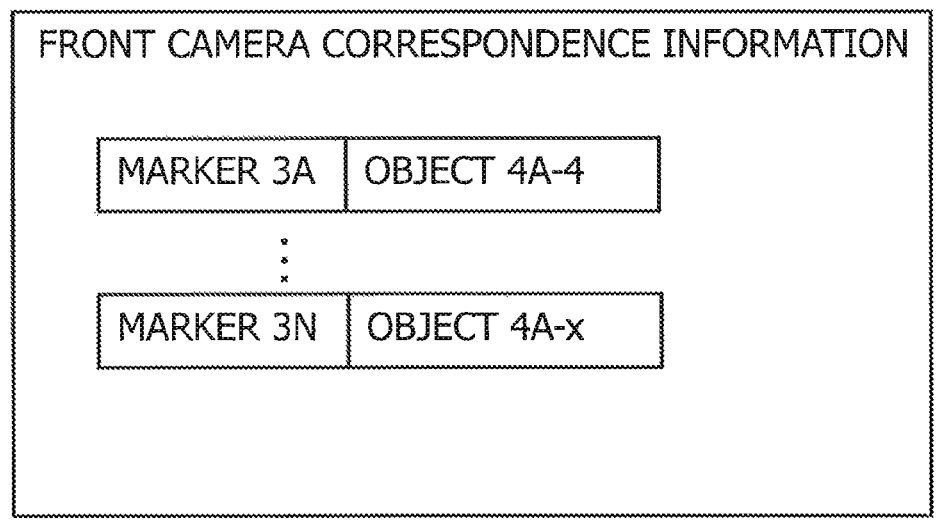

FIG. 6C shows example non-limiting rear camera correspondence information and example non-limiting front camera correspondence information according to the second embodiment. The rear camera correspondence information is information that is referred to in the case where a captured image is captured by the rear camera 15B. The front camera correspondence information is information that is referred to in the case where a captured image is captured by the front camera 15A. The rear camera correspondence information and the front camera correspondence information each contain the marker ID and the virtual object ID, and one virtual object is associated with one marker 3.

Note that, in the second embodiment, the rear camera correspondence information is prepared for every marker 3 used in the information processing system 100, and the front camera correspondence information may not be prepared for every marker 3 used in the information processing system 100. For example, in the case where the captured image is captured by the front camera 15A and where information on the detected marker 3 is not held in the front camera correspondence information, the object determining unit 25 refers to the rear camera correspondence information, and determines a virtual object. Not limited thereto, the front camera correspondence information may be prepared for every marker 3 used in the information processing system 100, and the rear camera correspondence information may not be prepared for every marker 3. Otherwise, both the rear camera correspondence information and the front camera correspondence information may not be prepared for every marker 3. In the case where information corresponding to the marker 3 detected from the captured image is not held in any of the rear camera correspondence information and the front camera correspondence information, no virtual object is displayed at the predetermined position based on the marker 3.

Flow of Processing

Figure 7:
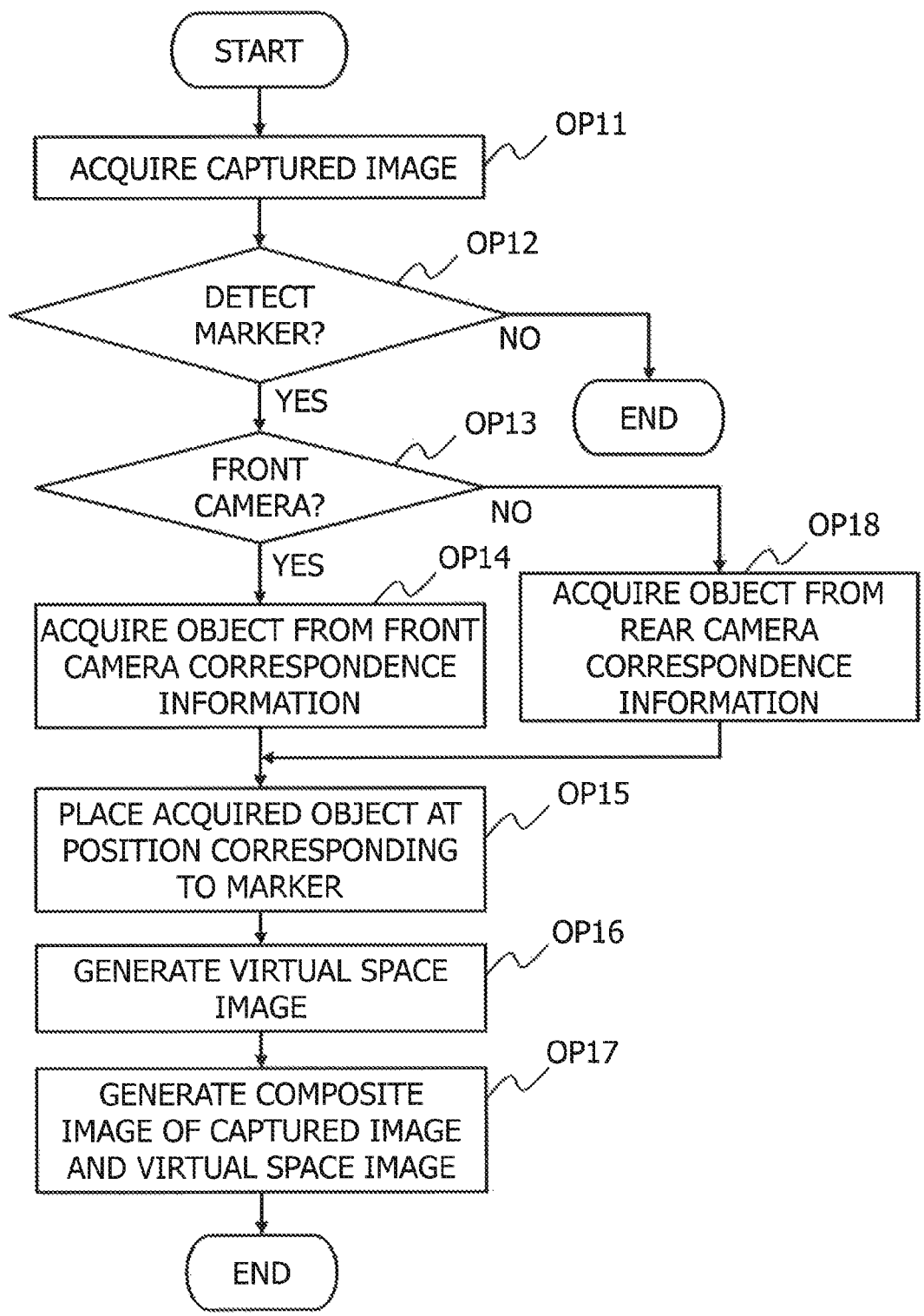
FIG. 7 shows an example non-limiting flow chart of the second AR process.

FIG. 7 shows an example non-limiting flow chart of the second AR process. The flow chart in FIG. 7 is started upon reception of a user operation for activating the AR function of the information processing apparatus 1.

In OP11, the captured image acquiring unit 21 acquires a captured image captured by the imaging device 15. Consequently, the flow chart in FIG. 7 is executed for each captured image acquired at the capturing rate (for example, 60 fps) of the imaging device 15. In OP12, the feature detecting unit 22 detects, from the captured image, the marker 3 corresponding to the marker image contained in the marker information, as a feature in the captured space. If the marker 3 is detected (OP12: YES), the processing proceeds to OP13. If the marker 3 is not detected (OP12: NO), the processing in FIG. 7 is ended.

In OP13, the object determining unit 25 determines whether or not the captured image is one captured by the front camera 15A. If the captured image is one captured by the front camera 15A (OP13: YES), the processing proceeds to OP14. If the captured image is one captured by the rear camera 15B (OP13: NO), the processing proceeds to OP18.

In OP14, because the captured image is one captured by the front camera 15A, the object determining unit 25 acquires a virtual object associated with the detected marker 3, from the front camera correspondence information. Note that, in the second embodiment, in the case where information on the detected marker 3 is not held in the front camera correspondence information, the object determining unit 25 acquires a virtual object indicated by the pointer in the rear camera correspondence information of the corresponding marker 3. The processing then proceeds to OP15.

In OP18, because the captured image is one captured by the rear camera 15B, the object determining unit 25 acquires a virtual object associated with the detected marker 3, from the rear camera correspondence information. The processing then proceeds to OP15.

OP15 to OP17 are similar to the processes of OP7 to OP9 in FIG. 5. In OP15 to OP17, the acquired virtual object is placed at the predetermined position based on the marker 3, a virtual space image is generated, a composite image of the captured image and the virtual space image is generated, and the composite image is displayed on the display 16.

For example, a virtual object that is not associated with any marker 3 in the rear camera correspondence information is associated in the front camera correspondence information. In this way, when this virtual object is captured by the front camera 15A, a character that is not displayed during capture by the rear camera 15B can be displayed. The rear camera 15B is frequently used to capture an AR marker, whereas the front camera 15A is rarely used to capture an AR marker. Hence, when the marker 3 is captured by the front camera 15A, if a virtual object that is not displayed during capture by the rear camera 15B is displayed, this virtual object can be presented as a hidden character to the user, so that the user can feel surprise, excitement, and the like.

Operations and Effects of Second Embodiment

In the second AR process, the virtual object placed at the position corresponding to the marker 3 changes in accordance with which of the front camera 15A and the rear camera 15B is detection means for the marker 3. As a result, the AR process can be rich in visual variety and excellent in entertainment.

Modification of Second AR Process

In the second AR process, the virtual object placed at the predetermined position based on the marker 3 changes in accordance with which of the front camera 15A and the rear camera 15B captures an image. In the case where the numbers of the provided front cameras 15A and the provided rear cameras 15B are more than one, correspondence information is prepared for each imaging device, whereby the virtual object displayed at the position corresponding to the marker 3 can be switched in accordance with which imaging device captures an image. For example, in the case where the rear cameras 15B include a right-eye camera and a left-eye camera for stereoscopic view, right-eye camera correspondence information and left-eye camera correspondence information are prepared, whereby the virtual object displayed at the predetermined position based on the marker 3 can be switched in accordance with which of the right-eye camera and the left-eye camera captures an image.

As described above, in the second AR process, the virtual object displayed at the predetermined position based on the marker 3 changes in accordance with which of the front camera 15A and the rear camera 15B captures an image. Alternatively, the aspect of the virtual object displayed at the predetermined position based on the marker 3 may change in accordance with which of the front camera 15A and the rear camera 15B captures an image. This can be implemented by, for example, associating, in the front camera correspondence information, a command indicating an aspect different from that in the rear camera correspondence information with the same virtual object as the virtual object that is associated with the corresponding marker 3 in the rear camera correspondence information. The aspect of the virtual object is similar to that described in the first embodiment.

Moreover, the second AR process can be combined with the first AR process. In the case where the first AR process and the second AR process are combined with each other, for example, any one or both of the rear camera correspondence information and the front camera correspondence information is/are provided with a configuration similar to that of the rear camera correspondence information according to the first embodiment, and any one or both of the processes of OP14 and OP18 in FIG. 7 are replaced with the processes of OP2 to OP6 in FIG. 5. As a result, the virtual object displayed at the position corresponding to the marker 3 changes in accordance with which of the rear camera 15B and the front camera 15A captures a captured image, and the virtual object displayed at the position corresponding to the marker 3 changes also in accordance with a user's action that causes the marker 3 to be recognized again.

Moreover, with the use of the second AR process, for example, when the front camera 15A is activated, update of a virtual space, in which a virtual object displayed correspondingly to the front camera 15A is placed, can be stopped, and a virtual space image at this time can be held. Then, when the activated camera is switched to the rear camera 15B, the held virtual space image including the virtual object corresponding to the front camera 15A can be superimposed on a captured image of a real space captured by the rear camera 15B, and the resultant composite image can be displayed on the display 16. The update of the virtual space may be stopped by, for example, a user operation such as pressing of an operation button, and may be stopped upon switching from the front camera 15A to the rear camera 15B. The update of the virtual space is stopped by, for example, processing of the feature detecting unit 22 and the posture detecting unit 23, that is, marker detection from the captured image and disabling update of the display reference information. As a result, a virtual object that is displayed in the case where the marker 3 is captured by the front camera 15A can be captured by the rear camera 15B. Similarly, a virtual object that is displayed in the case where the marker 3 is captured by the rear camera 15B can be captured by the front camera 15A.

Third Embodiment

In the third embodiment, the information processing apparatus 1 performs a third AR process. In the third AR process, the reference marker 3Y is detected, whereby each virtual object associated with the detected marker 3 other than the reference marker 3Y is associated with the reference marker 3Y. In the third embodiment, description overlapping with that in the first and second embodiments is omitted.

Figure 8:
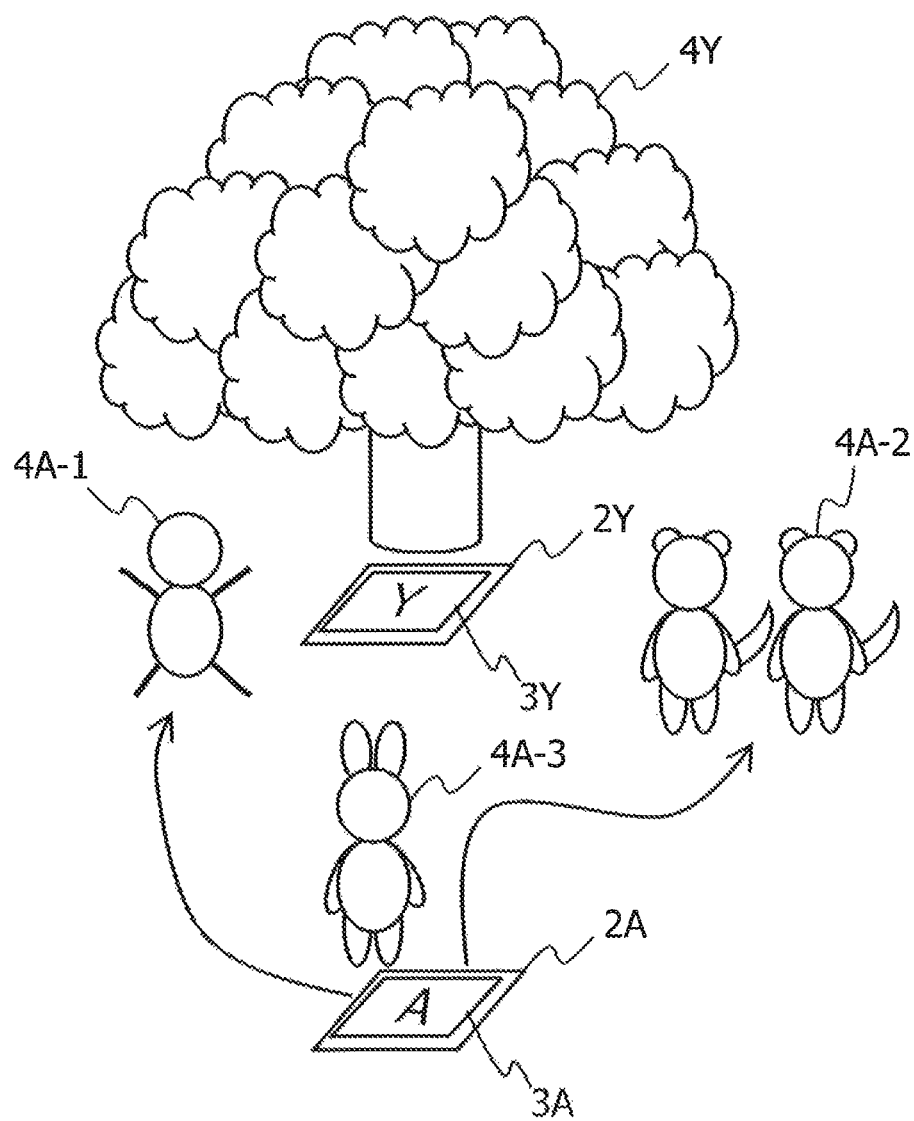
FIG. 8 shows an example non-limiting third AR process of an information processing apparatus according to a third embodiment.

FIG. 8 shows an example non-limiting third AR process of the information processing apparatus 1 according to the third embodiment. In the third AR process, in the case where the reference marker 3Y and the marker 3A are captured together, a virtual object associated with the marker 3A moves to a position corresponding to the reference marker 3Y, on the screen of the display 16. Hereinafter, compared with the reference marker 3Y, the marker 3A that is not the reference marker is referred to as normal marker.

In FIG. 8, the virtual object 4Y associated with the reference marker 3Y is displayed at a predetermined position based on the reference marker 3Y, on the screen of the display 16. The virtual object 4Y is an object representing a tree.

The virtual object 4A-1 associated with the normal marker 3A is displayed at a predetermined position based on the normal marker 3A, and the virtual object 4A-1 then moves to the predetermined position based on the reference marker 3Y.

Similarly to the first AR process, each time a user's action such as an action of once moving the normal marker 3A out of the capturing range and then returning the normal marker 3A into the capturing range is performed, the virtual objects 4A-2 and 4A-3 different from that in the last time are displayed at the predetermined position based on the normal marker 3A. The virtual objects 4A-2 and 4A-3 also move to the predetermined position based on the reference marker 3Y. At this time, the virtual object 4A-1 that has already been displayed continues to be displayed on the screen. As a result, in the third AR process, the virtual objects 4A-1, 4A-2, and 4A-3 displayed at the predetermined position based on the normal marker 3A gather to the reference marker 3Y.

In the third AR process, the information processing apparatus 1 associates each virtual object displayed at the predetermined position corresponding to the normal marker 3A captured together with the reference marker 3Y, with the reference marker 3Y. As a result, even if the normal marker 3A is moved out of the capturing range, in the case where the reference marker 3Y is in the capturing range, the virtual object 4 originally displayed at the predetermined position based on the normal marker 3A continues to be displayed at the predetermined position corresponding to the reference marker 3Y, on the screen. Moreover, in a case (similar to the first AR process) where the virtual object displayed correspondingly to the normal marker 3A changes each time the normal marker 3A is detected from the captured image, a plurality of virtual objects associated with the normal marker 3A are displayed on the same screen.

Figure 9:
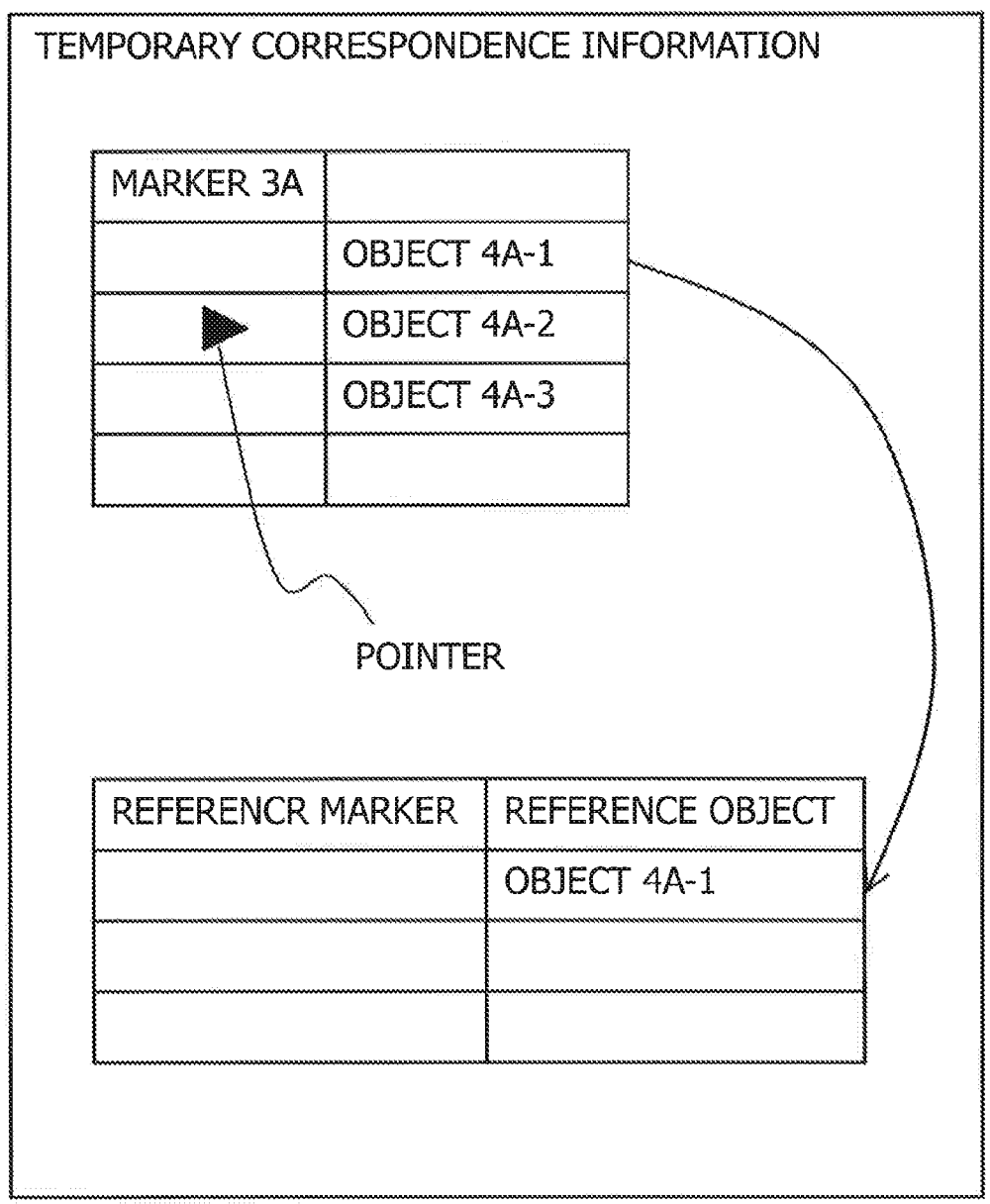
FIG. 9 shows example non-limiting temporary correspondence information.

FIG. 9 shows example non-limiting temporary correspondence information. The temporary correspondence information is information that is referred to in the case where the normal marker 3 is detected together with the reference marker 3Y, and is empty in its initial state. The example in FIG. 9 is temporary correspondence information in the case where the normal marker 3A is detected together with the reference marker 3Y.

In the case where the reference marker 3Y and the normal marker 3A are detected together from the captured image, information on the detected reference marker 3Y and normal marker 3A is copied from the rear camera correspondence information to the temporary correspondence information. The virtual object ID that is indicated by the pointer in the information on the normal marker 3A is written into the information on the reference marker 3Y. As a result, the virtual object is associated with the reference marker 3Y, and the number of virtual objects associated with the reference marker 3Y increases.

Note that, in the temporary correspondence information, the association between the normal marker 3A and a virtual object newly associated with the reference marker 3Y may be maintained, and may be canceled upon the association between the reference marker 3Y and the virtual object. In the case where the association between the normal marker 3A and a virtual object newly associated with the reference marker 3Y is canceled, the virtual object originally associated with the normal marker 3A moves to the association with the reference marker 3Y each the normal marker 3A is detected. Hence, finally, even if the normal marker 3A is detected, no virtual object is displayed at the position corresponding to the normal marker 3A.

Flow of Processing

Figure 10A:
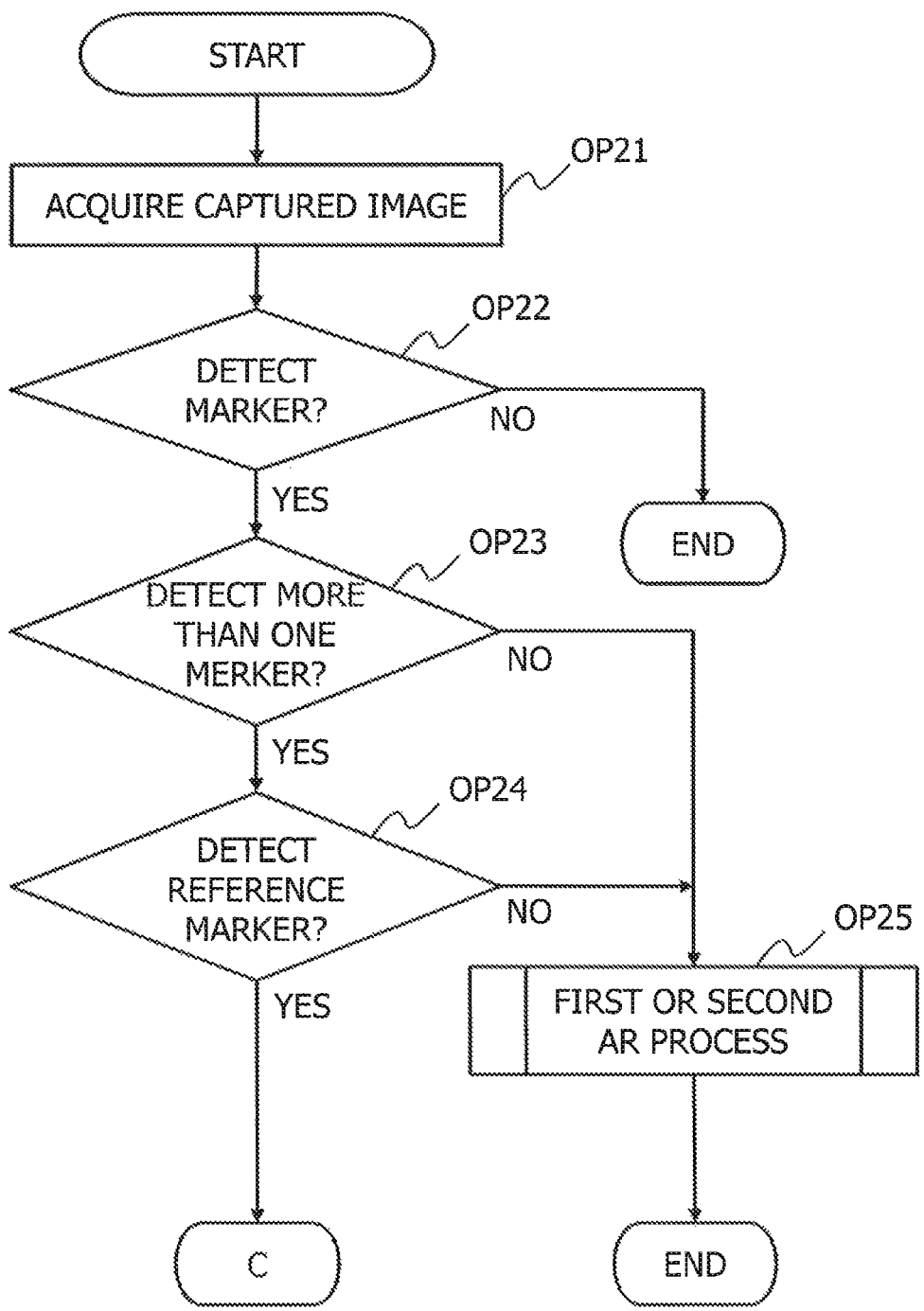
FIG. 10A shows an example non-limiting flow chart of the third AR process.
Figure 10B:
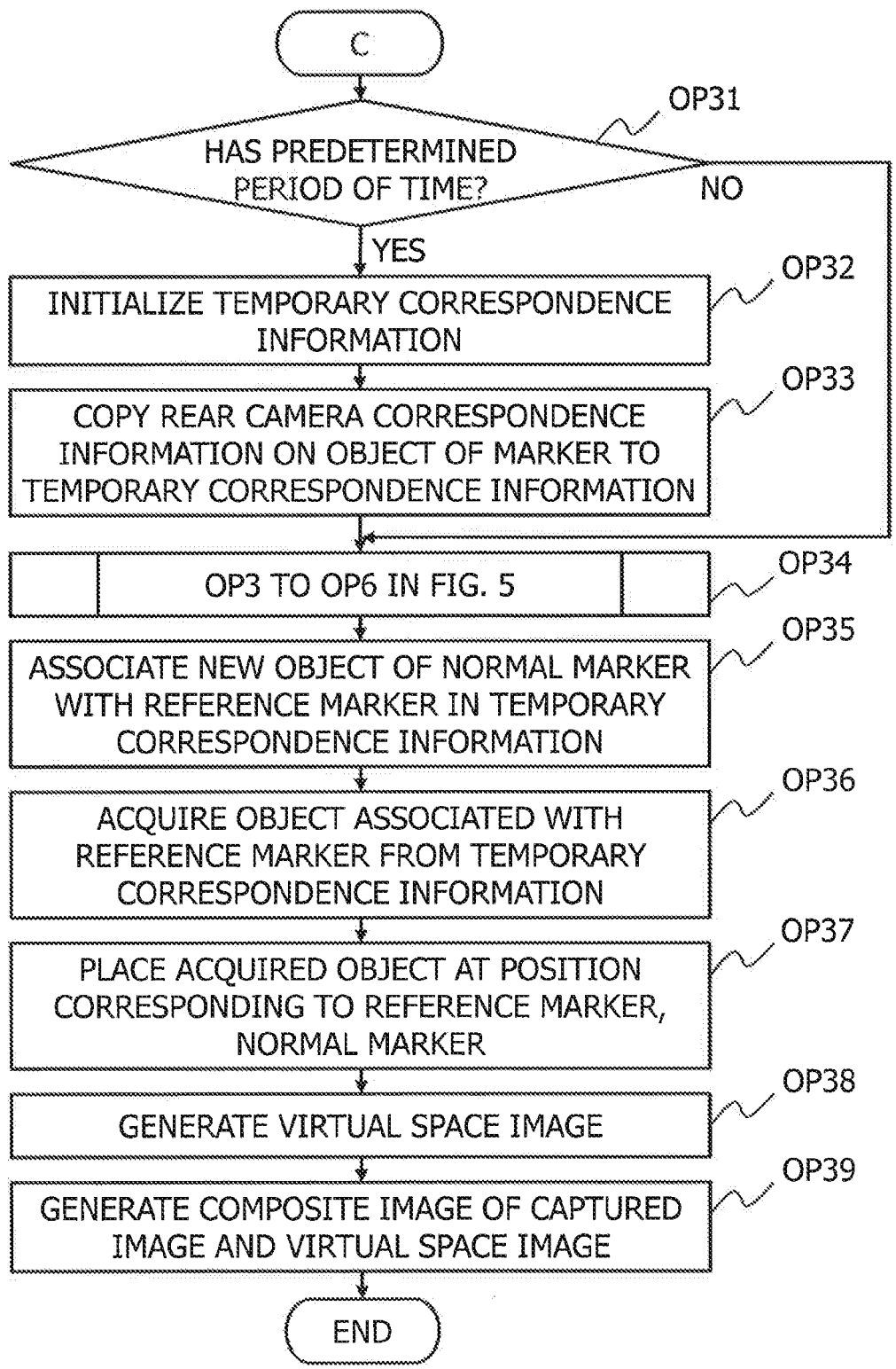
FIG. 10B shows an example non-limiting flow chart of the third AR process.

FIG. 10A and FIG. 10B show an example non-limiting flow chart of the third AR process. The flow chart in FIG. 10A and FIG. 10B is started upon reception of a user operation for activating the AR function of the information processing apparatus 1.

In OP21, the captured image acquiring unit 21 acquires a captured image captured by the imaging device 15. Consequently, the flow chart in FIG. 10A and FIG. 10B is executed for each captured image acquired at the capturing rate (for example, 60 fps) of the imaging device 15. In OP22, the feature detecting unit 22 detects, from the captured image, the marker 3 corresponding to the marker image contained in the marker information, as a feature in the captured space. If the marker is detected (OP22: YES), the processing proceeds to OP23. If the marker is not detected (OP22: NO), the processing in FIG. 10A and FIG. 10B is ended.

In OP23, if the number of the markers 3 detected by the feature detecting unit 22 is more than one (OP23: YES), the processing proceeds to OP24. If the number of the markers 3 detected by the feature detecting unit 22 is one (OP23: NO), the processing proceeds to OP25, and the first or second AR process (the processes of OP3 to OP9 in FIG. 5 or the processes of OP13 to OP18 in FIG. 7) is executed. After that, the processing in FIG. 10A and FIG. 10B is ended.

In OP24, the object determining unit 25 determines whether or not the reference marker 3Y is included in the plurality of detected markers 3. If the reference marker 3Y is included in the detected markers 3 (OP24: YES), the processing proceeds to OP31. If the reference marker 3Y is not included in the detected markers (OP24: NO), the processing proceeds to OP25, and the first or second AR process (the processes of OP3 to OP9 in FIG. 5 or the processes of OP13 to OP18 in FIG. 7) is executed. After that, the processing in FIG. 10A and FIG. 10B is ended.

In OP31, the object determining unit 25 determines whether or not the measured elapsed time from the last-time detection of the reference marker 3Y is equal to or more than a predetermined period of time. The predetermined period of time is, for example, 3 seconds or more. Alternatively, the predetermined period of time may be the second time threshold in the first AR process. If the measured elapsed time from the last-time detection of the reference marker 3Y is less than the predetermined period of time (OP31: NO), the processing proceeds to OP34. If the measured elapsed time from the last-time detection of the reference marker 3Y is equal to or more than the predetermined period of time (OP31: YES), the processing proceeds to OP32.

In OP32, the object determining unit 25 initializes the temporary correspondence information. The temporary correspondence information is empty in its initial state. The processing then proceeds to OP33.

In OP33, the object determining unit 25 copies the rear camera correspondence information on the detected reference marker 3Y and normal marker 3 to the temporary correspondence information. The processing then proceeds to OP34.

In OP34, the object determining unit 25 determines a virtual object to be placed at the position corresponding to the normal marker 3. The process of OP34 is similar to the processes of OP3 to OP6 in FIG. 5 in the first AR process, except that the information referred to is the temporary correspondence information. That is, in the case where the measured elapsed time from the last-time detection of the normal marker 3 is less than the first time threshold or equal to or more than the second time threshold, the object determining unit 25 determines a virtual object indicated by the pointer in the temporary correspondence information of the normal marker 3, as the virtual object to be placed at the predetermined position based on the normal marker 3. In the case where the measured elapsed time from the last-time detection of the normal marker 3 is equal to or more than the first time threshold and less than the second time threshold, the object determining unit 25 moves the pointer in the temporary correspondence information of the normal marker 3, and determines a virtual object at the movement destination as the virtual object to be placed at the predetermined position based on the normal marker 3. The processing then proceeds to OP35.

In OP35, the object determining unit 25 associates the virtual object to be placed at the predetermined position based on the normal marker 3, which is newly determined in OP34, with the reference marker 3Y in the temporary correspondence information. The processing then proceeds to OP36.

In OP36, the object determining unit 25 acquires the virtual object associated with the reference marker 3Y from the temporary correspondence information. The processing then proceeds to OP37.

In OP37 to OP39, processes similar to those of OP7 to OP9 in FIG. 5 are performed. That is, each acquired virtual object is placed at the predetermined position based on the reference marker 3Y, a virtual space image is generated, a composite image of the captured image and the virtual space image is generated, and the composite image is displayed on the display 16. After that, the processing in FIG. 10A and FIG. 10B is ended. Note that, in the case where a virtual object is one newly associated with the reference marker 3Y, the virtual object is set so as to: be first placed at the predetermined position based on the normal marker 3, as the predetermined position based on the reference marker 3Y; and move to another predetermined position based on the reference marker 3Y. This motion of the virtual object is set to the virtual object by the object determining unit 25, when the virtual object is newly associated with the reference marker 3Y and is acquired as the virtual object to be placed on the basis of the reference marker 3Y. Moreover, the virtual object is controlled by, for example, a dedicated program, and the above-mentioned motion of the virtual object is controlled by this program.

In OP35, the virtual object determined to be placed at the predetermined position based on the normal marker 3 is associated with the reference marker 3Y in the temporary correspondence information. As a result, for example, even if the normal marker 3 is moved out of the capturing range and is not detected anymore, the virtual object associated with the normal marker 3 continues to be displayed, due to the association with the reference marker 3Y in the temporary correspondence information.

Moreover, a process similar to the first AR process is performed on the normal marker 3. Hence, the normal marker 3 is moved out of and into the capturing range while the reference marker 3Y is captured, whereby the plurality of virtual objects associated with the normal marker 3 are associated with the reference marker 3Y one after another. On the screen of the display 16, the number of virtual objects on the screen increases, and, finally, all the virtual objects associated with the normal marker 3 gather to the predetermined position corresponding to the reference marker 3Y.

Moreover, in the case where the association between a virtual object and the normal marker 3 is maintained even after the virtual object is newly associated with the reference marker 3Y, the same virtual object as this virtual object is displayed by repeating a user's action that causes the information processing apparatus 1 to recognize the normal marker 3 again. As a result, a plurality of the same virtual objects can be displayed on the same screen.

According to the third AR process, virtual objects associated with the normal marker 3 are associated with the reference marker 3Y, and hence the plurality of virtual objects associated with one normal marker 3 can be displayed on the same screen.

Operations and Effects of Third Embodiment

In the third AR process, the reference marker 3Y and the normal marker 3 are detected together, whereby a virtual object associated with the normal marker 3 is associated with the reference marker 3Y. As a result, the AR process can be rich in visual variety and excellent in entertainment.

Modification of Third AR Process

In the third AR process, a plurality of placement points for virtual objects based on the reference marker 3Y may be set in advance, and a virtual object placed at the predetermined position based on the normal marker 3 may execute a command of moving to the closest placement point. In the case where another virtual object has already been placed at the closest placement point, the target virtual object is moved to the placement point that is closest to the predetermined position based on the normal marker 3, of the available placement points. Moreover, while a virtual object placed at the predetermined position based on the normal marker 3 is moving to the closest placement point, in the case where the position of the reference marker 3Y in the captured image changes and where the closest placement point as the movement destination also moves accordingly, the placement point closest to the virtual object may be newly detected, and the detected placement point may be set as the movement destination of the virtual object. The virtual object is controlled by, for example, a dedicated program, and this program is caused to execute a command of moving the virtual object to the closest placement point.

Moreover, in the third AR process, the reference marker 3Y may not be associated with any virtual object in the rear camera correspondence information or the front camera correspondence information. In the case where the reference marker 3Y and the normal marker 3 are detected together, a virtual object associated with the normal marker 3 is displayed.

Moreover, in the third embodiment, in the third AR process, the first AR process is executed for each normal marker 3, but the present disclosure is not limited thereto. For example, in the third AR process, a plurality of virtual objects may not be associated with one normal marker 3, but one virtual object may be associated therewith. In this case, for example, each time the normal marker 3 is moved out of and into the capturing range, the number of virtual objects that are associated with the normal marker 3 and are associated with the reference marker 3Y may increase. Alternatively, in the third AR process, the virtual object may change in accordance with the period of time of continuous detection of the normal marker 3.

Moreover, in the third embodiment, a virtual object associated with the normal marker 3 is associated with the reference marker 3Y in the temporary correspondence information, before the virtual object is placed at the predetermined position (see FIG. 10B). Not limited thereto, a virtual object associated with the normal marker 3 may be associated with the reference marker 3Y in the temporary correspondence information, for example, after the lapse of a predetermined period of time from when the virtual object is placed at the predetermined position corresponding to the normal marker 3.

This can be implemented by, for example, adding determination as to whether or not the number of times or the period of time of continuous detection of the corresponding normal marker 3 reaches a predetermined number of times or a predetermined period of time, to between the processes of OP34 and OP35 in the flow chart of FIG. 10B. In the case where the number of times or the period of time of continuous detection of the corresponding normal marker 3 reaches the predetermined number of times or the predetermined period of time, the processing proceeds to OP35, and the virtual object associated with the normal marker 3 is associated with the reference marker 3Y. In the case where the number of times or the period of time of continuous detection of the corresponding normal marker 3 does not reach the predetermined number of times or the predetermined period of time, the processing proceeds to OP36.

As a result, in the case where the normal marker 3 and the reference marker 3Y are captured, the virtual object associated with the normal marker 3 is displayed for a predetermined period of time at the predetermined position corresponding to the normal marker 3, on the screen of the display 16. For example, after the lapse of the predetermined period of time, the virtual object is associated with the reference marker 3Y, whereby the virtual object moves to a predetermined placement point of the reference marker 3Y, on the screen of the display 16.

Fourth Embodiment

In the fourth embodiment, the information processing apparatus performs a fourth AR process. In the fourth AR process, the aspect of a displayed virtual object changes in accordance with the posture of the marker 3. In the fourth embodiment, description overlapping with that in the first to third embodiments is omitted.

Figure 11A:
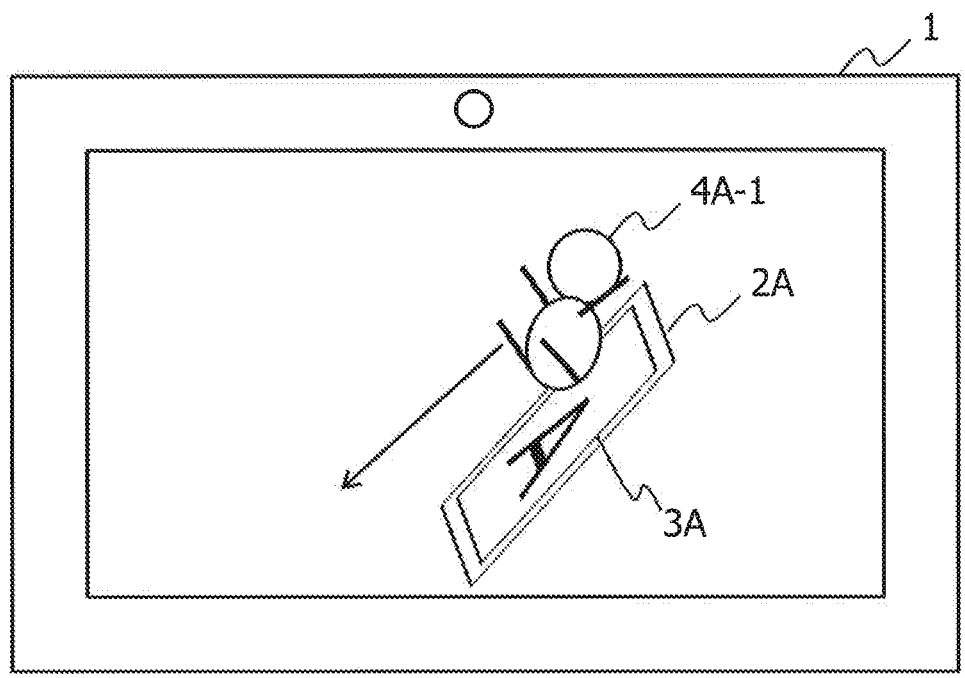
FIG. 11A shows an example non-limiting fourth AR process.
Figure 11B:
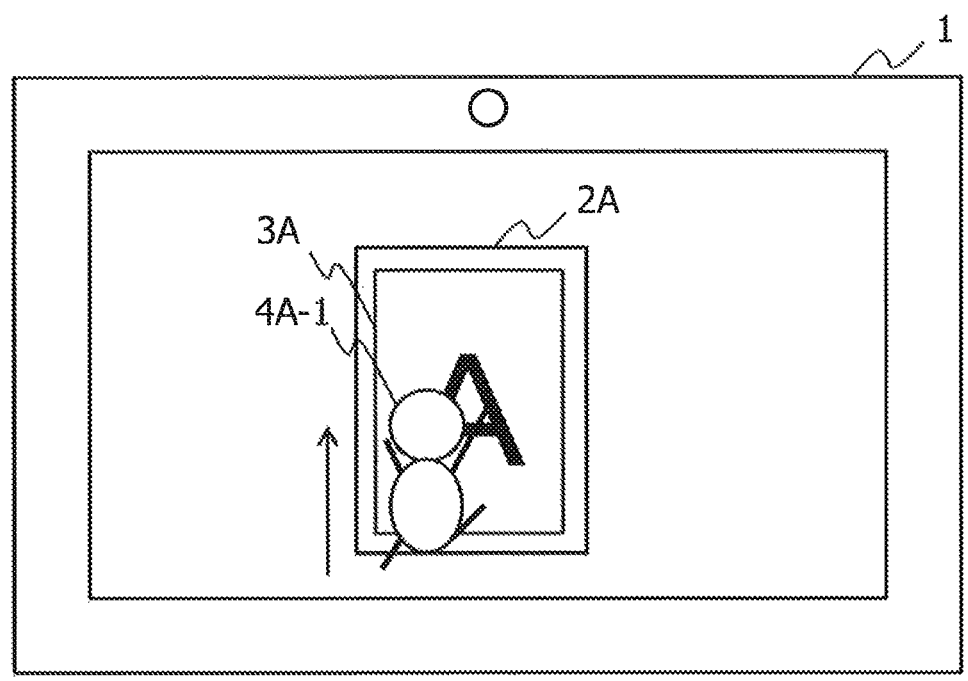
FIG. 11B shows an example non-limiting fourth AR process.

FIG. 11A and FIG. 11B show an example non-limiting fourth AR process. The same marker 3A is displayed on screens of FIG. 11A and FIG. 11B, and the same virtual object 4A-1 is displayed on both the screens. The posture of the marker 3A is different between FIG. 11A and FIG. 11B, and the motion of the virtual object 4A-1 is also different therebetween accordingly. In FIG. 11A, the marker 3A is recognized so as to be inclined at a predetermined angle with respect to the horizontal direction and the perpendicular direction of the display screen of the display 16, and the virtual object 4A-1 makes a motion of sliding down the card 2A likened to a slope. In FIG. 11B, the marker 3A is recognized without any inclination in the horizontal direction of the display screen of the display 16, and the virtual object 4A-1 climbs the card 2A likened to a wall.

Both the hardware configuration and the functional configuration of the information processing apparatus 1 that executes the fourth AR process are similar to those in the first embodiment (see FIG. 1 and FIG. 3). In the fourth AR process, the object determining unit 25 uses posture correspondence information to determine a virtual object to be placed at the predetermined position based on the detected marker 3.

FIG. 12 shows example non-limiting posture correspondence information. The posture correspondence information holds the association between the marker 3 and a virtual object and the association between a posture of the marker 3 and a motion of the virtual object. The posture correspondence information holds, for each motion, identification information on a file in which a command for causing the virtual object to make a predetermined motion is written. Separately from the posture correspondence information, for example, the auxiliary storage device 14 holds a definition of each posture, the definition using a vector whose start point is the origin of a common coordinate system defined by three axes orthogonal to one another. The posture correspondence information holds, for each posture, for example, discrimination information on a file in which the definition of the posture is written. A value of the vector for defining the posture is a vector that serves as the basis for detecting the posture, and the closest one is detected in consideration of the defined vector together with an additional predetermined range, at the time of posture detection.

Note that, in FIG. 12, as an example of the aspect, a motion is associated with a posture. Not limited thereto, for example, part of the external appearance (such as a facial expression and clothes) of a character may be associated therewith. Moreover, separately from the posture correspondence information, for example, the auxiliary storage device 14 holds a definition of the association between discrimination information on an aspect and a file including a command of causing a virtual object to execute the aspect.

Figure 13:
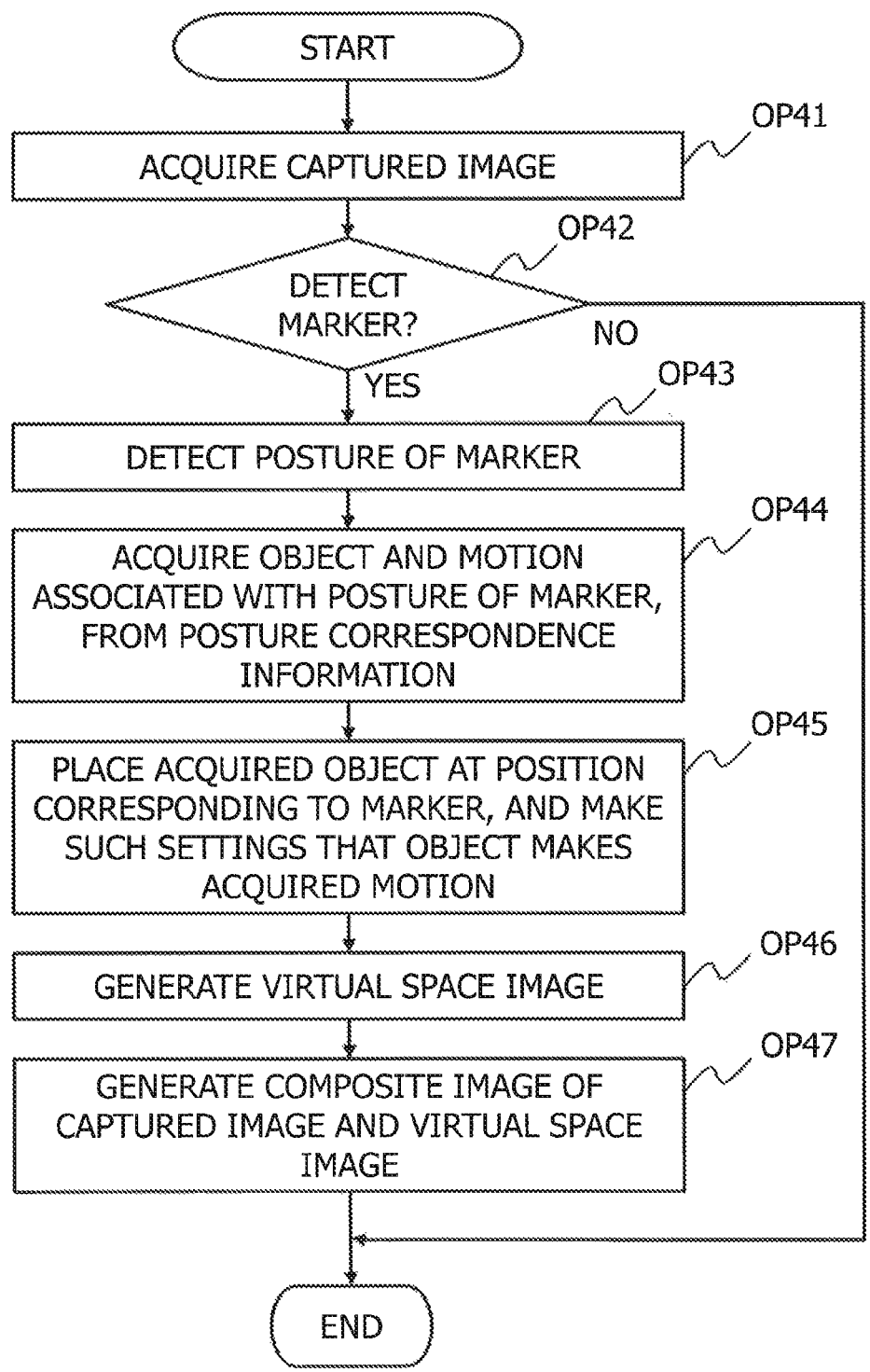
FIG. 13 shows an example non-limiting flow chart of the fourth AR process.

FIG. 13 shows an example non-limiting flow chart of the fourth AR process. The flow chart in FIG. 13 is started upon reception of a user operation for activating the AR function of the information processing apparatus 1.

In OP41, the captured image acquiring unit 21 acquires a captured image captured by the imaging device 15. Consequently, the flow chart in FIG. 13 is executed for each captured image acquired at the capturing rate (for example, 60 fps) of the imaging device 15. In OP42, the feature detecting unit 22 detects, from the captured image, the marker 3 corresponding to the marker image contained in the marker information, as a feature in the captured space. If the marker is detected (OP42: YES), the processing proceeds to OP43. If the marker is not detected (OP42: NO), the processing in FIG. 13 is ended.

In OP43, the posture detecting unit 23 detects a posture of the detected marker 3. The processing then proceeds to OP44.

In OP44, the object determining unit 25 acquires a virtual object associated with the detected marker 3 and a motion associated with the detected posture, from the posture correspondence information. The processing then proceeds to OP45. In the case where the number of the detected markers 3 is more than one, the processes of OP43 and OP44 are executed for each marker 3.

In OP45, the image generating unit 26 places the acquired virtual object at the predetermined position corresponding to the associated marker 3, and makes such settings that the virtual object makes the acquired motion. The position and posture of the marker 3 have been detected as the display reference information by the posture detecting unit 23 together with the detection of the marker 3, and the image generating unit 26 places the virtual object at the predetermined position corresponding to the marker 3 in accordance with the display reference information. The processing then proceeds to OP46.

In OP46, the image generating unit 26 generates an image of the virtual space. In OP47, the display controlling unit 27 generates a composite image in which the image of the virtual space is superimposed on the captured image, and outputs and displays the composite image onto the display 16.

Operations and Effects of Fourth Embodiment

In the fourth embodiment, the aspect of a displayed virtual object changes in accordance with the posture of the detected marker 3. As a result, the AR process rich in visual variety can be provided. Moreover, an inquiring mind of the user about a change in posture of the marker 3 can be encouraged.

In the fourth embodiment, the aspect of a displayed virtual object changes in accordance with the posture of the detected marker 3. Alternatively, the displayed virtual object itself may change in accordance with the posture of the marker 3. This can be implemented by holding the association between a posture and a virtual object in the posture correspondence information.

Moreover, the first embodiment and the fourth embodiment can be carried out in combination. This can be implemented by, for example, not holding the combination of the marker 3 and a virtual object in the posture correspondence information, acquiring the virtual object associated with the marker 3 from the rear camera correspondence information or the front camera correspondence information, and acquiring the aspect of the acquired virtual object from the posture correspondence information.

Variations of Embodiments

In the above-mentioned embodiments, the display controlling unit 27 displays a composite image in which an image of the virtual space is superimposed on a captured image, on the display device, whereby the image of the virtual space can be visually recognized by the user while being superimposed on the real space. However, it is sufficient that the display controlling unit 27 displays an image on the display device such that an image of the virtual space is visually recognized by the user while being superimposed on the real space, and hence the present disclosure is not limited to a technique of displaying a composite image. For example, the present disclosure may also be applied to augmented reality techniques in which a virtual space image is projected on the field of view of the user, to be thereby visually recognized by the user while being superimposed on the real space. Examples of such augmented reality techniques include a HUD (Head-Up Display) and a technique in which a virtual space image is projected on glasses worn by the user.

In the above-mentioned embodiments, the information processing apparatus 1 performs the above-mentioned processing alone, but the present disclosure is not limited thereto. The processing in each of the above-mentioned embodiments may be performed by a plurality of information processing apparatuses in a distributed manner. For example, the rear camera correspondence information may be held in a database on a network, and the information processing apparatus 1 may access the database to acquire the rear camera correspondence information. Moreover, for example, the processing by the image generating unit 26 may be designed to be executed by a server on the network. In this way, the information processing apparatus 1 may transmit a detection result of the marker 3 to the server, and the server may generate a virtual space image and transmit the virtual space image to the information processing apparatus 1.

According to the present disclosure, an augmented reality technique rich in visual variety can be provided.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable recording medium recording an information processing program, which when executed by a computer, causes the computer to perform operations comprising:
storing, in a memory accessible by the computer, a plurality of associations between a feature and a plurality of aspects of a virtual object;
acquiring an image of a real space captured by an imaging device;
detecting the feature from the image of the real space;
counting, based on the detecting, a number of times of detection of the feature for which it is determined that an elapsed time from last-time detection of the feature is equal to or more than a non-zero first threshold;
changing a first aspect of the virtual object, determined based on a first association from the stored plurality of associations, to a second aspect of the virtual object, determined based on a second association from the stored plurality of associations, the virtual object placed in a virtual space on a basis of the feature when the feature is detected again after an elapsed time from last-time detection of the feature is equal to or more than a non-zero first threshold;
generating an image of the virtual space in which the virtual object in the second aspect is placed on a basis of the feature; and
displaying an image on a display device such that the image of the virtual space is superimposed on an image of the real space.

2. The non-transitory computer-readable recording medium recording an information processing program, according to claim 1, wherein the changing is performed on the basis of the feature, for a recognition condition of the feature, when it is determined that an elapsed time from last-time detection of the feature is equal to or more than a first threshold.

3. The non-transitory computer-readable recording medium recording an information processing program, according to claim 2, wherein the changing is performed on the basis of the feature, when it is determined that the elapsed time is equal to or more than the first threshold and less than a second threshold.

4. The non-transitory computer-readable recording medium recording an information processing program, according to claim 1, wherein the changing is performed on the basis of the feature in accordance with the number of times of detection of the feature for which it is determined that the elapsed time is equal to or more than the first threshold and less than a second threshold.

5. The non-transitory computer-readable recording medium recording an information processing program, according to claim 1, wherein the changing is performed on the basis of the feature in accordance with duration of the detection of the feature from the image for a recognition condition of the feature.

6. The non-transitory computer-readable recording medium recording an information processing program, according to claim 1, wherein the changing is performed on the basis of the feature in accordance with a posture of the feature for a recognition condition of the feature.

7. The non-transitory computer-readable recording medium recording an information processing program, according to claim 1, wherein the changing is performed on the basis of the feature, in predetermined order from among a plurality of virtual objects associated with the feature or a plurality of aspects of a virtual object associated with the feature.

8. The non-transitory computer-readable recording medium recording an information processing program, according to claim 7, wherein the changing is performed on the basis of the feature, cyclically in the predetermined order.

9. The non-transitory computer-readable recording medium recording an information processing program, according to claim 1, wherein
the aspect of the virtual object is defined by an external appearance of the virtual object.

10. The non-transitory computer-readable recording medium recording an information processing program, according to claim 1, wherein
the aspect of the virtual object is defined by a posture of the virtual object.

11. The non-transitory computer-readable recording medium recording an information processing program, according to claim 1, wherein
the aspect of the virtual object is defined by a motion made by the virtual object.

12. An information processing apparatus comprising a memory and at least one processor configured to perform operations comprising:
storing, in the memory, a plurality of associations between a feature and a plurality of aspects of a virtual object;
acquiring an image of a real space captured by an imaging device;
detecting the feature from the image of the real space;
counting, based on the detecting, a number of times of detection of the feature for which it is determined that an elapsed time from last-time detection of the feature is equal to or more than a non-zero first threshold;
changing a first aspect, determined based on a first association from the stored plurality of associations, to a second aspect of the virtual object, determined based on a second association from the stored plurality of associations, the virtual object placed in a virtual space on a basis of the feature when the feature is detected again after an elapsed time from last-time detection of the feature is equal to or more than a non-zero first threshold;
generating an image of the virtual space in which the virtual object in the second aspect is placed on a basis of the feature; and
displaying an image on a display device such that the image of the virtual space is superimposed on an image of the real space.

13. An information processing system comprising:
a computer;
an imaging device;
a display device; and
a feature placed in a real space, wherein the computer includes a memory and at least one processor configured to:
store, in the memory, a plurality of associations between a feature and a plurality of aspects of a virtual object;
acquire an image of the real space captured by the imaging device;
detect the feature from the image of the real space;
counting, based on the detecting, a number of times of detection of the feature for which it is determined that an elapsed time from last-time detection of the feature is equal to or more than a non-zero first threshold;
change a first aspect, determined based on a first association from the stored plurality of associations, to a second aspect of the virtual object, determined based on a second association from the stored plurality of associations, the virtual object placed in a virtual space on a basis of the feature when the feature is detected again after an elapsed time from last-time detection of the feature is equal to or more than a non-zero first threshold;
generate an image of the virtual space in which the virtual object in the second aspect is placed on a basis of the feature; and
display an image on the display device such that the image of the virtual space is superimposed on an image of the real space.

14. An information processing method comprising:
storing, in a memory accessible by a computer, a plurality of associations between a feature and a plurality of aspects of a virtual object;
acquiring, by a computer, an image of a real space captured by an imaging device;
detecting, by the computer, a feature from the image of the real space;
counting, based on the detecting, a number of times of detection of the feature for which it is determined that an elapsed time from last-time detection of the feature is equal to or more than a non-zero first threshold;
changing a first aspect of the virtual object, determined based on a first association from the stored plurality of associations, to a second aspect of the virtual object, determined based on a second association from the stored plurality of associations, the virtual object placed in a virtual space on a basis of the feature when the feature is detected again after an elapsed time from last-time detection of the feature is equal to or more than a non-zero first threshold;
generating, by the computer, an image of the virtual space in which the virtual object in the second aspect is placed on a basis of the feature; and
displaying, by the computer, an image on a display device such that the image of the virtual space is superimposed on an image of the real space.

* * * * *